United States Patent
Friesen et al.

(10) Patent No.: US 12,021,488 B2
(45) Date of Patent: Jun. 25, 2024

(54) SOLAR THERMAL UNIT

(71) Applicant: Source Global, PBC, Scottsdale, AZ (US)

(72) Inventors: Cody Friesen, Fort McDowell, AZ (US); Michael Robinson, Scottsdale, AZ (US); Grant Friesen, Scottsdale, AZ (US); Heath Lorzel, Mesa, AZ (US); Justin Zachary Bessant, Scottsdale, AZ (US)

(73) Assignee: Source Global, PBC, Scottsdale, AZ (US)

( * ) Notice: Subject to any disclaimer, the term of this patent is extended or adjusted under 35 U.S.C. 154(b) by 393 days.

(21) Appl. No.: 17/346,023

(22) Filed: Jun. 11, 2021

(65) Prior Publication Data
US 2021/0305935 A1    Sep. 30, 2021

Related U.S. Application Data

(63) Continuation of application No. 16/543,323, filed on Aug. 16, 2019, now Pat. No. 11,159,123, which is a
(Continued)

(51) Int. Cl.
*H02S 40/44* (2014.01)
*B01D 53/06* (2006.01)
(Continued)

(52) U.S. Cl.
CPC ............ *H02S 40/44* (2014.12); *B01D 53/06* (2013.01); *B01D 53/08* (2013.01); *B01D 53/261* (2013.01);
(Continued)

(58) Field of Classification Search
None
See application file for complete search history.

(56) References Cited

U.S. PATENT DOCUMENTS

| | | | |
|---|---|---|---|
| 1,816,592 | A | 7/1931 | Knapen |
| 2,138,689 | A | 11/1938 | Altenkirch |

(Continued)

FOREIGN PATENT DOCUMENTS

| | | | | |
|---|---|---|---|---|
| CH | 703472 | A1 * | 1/2012 | ............ F24J 2/0477 |
| CN | 1774401 | | 5/2006 | |

(Continued)

OTHER PUBLICATIONS

Machine translation of CH703472A1 (Year: 2012).*
(Continued)

*Primary Examiner* — Ryan S Cannon
(74) *Attorney, Agent, or Firm* — Snell & Wilmer L.L.P.

(57) ABSTRACT

Solar thermal units and methods of operating solar thermal units for the conversion of solar insolation to thermal energy are provided. In some examples, solar thermal units have an inlet, and a split flow of heat absorbing fluid to either side of the solar thermal unit, along a first fluid flow path and a second fluid flow path. Optionally, one or more photovoltaic panels can be provided as part of the solar thermal unit, which may convert solar insolation to electric power that may be used by a system connected to the solar thermal unit.

20 Claims, 10 Drawing Sheets

Related U.S. Application Data continuation of application No. 15/482,104, filed on Apr. 7, 2017, now Pat. No. 10,469,028.

(60) Provisional application No. 62/319,721, filed on Apr. 7, 2016.

(51) Int. Cl.
| | | |
|---|---|---|
| *B01D 53/08* | (2006.01) | |
| *B01D 53/26* | (2006.01) | |
| *F24S 10/25* | (2018.01) | |
| *F24S 10/50* | (2018.01) | |
| *F24S 10/80* | (2018.01) | |
| *F24S 10/95* | (2018.01) | |
| *F24S 20/00* | (2018.01) | |

(52) U.S. Cl.
CPC .............. *F24S 10/25* (2018.05); *F24S 10/50* (2018.05); *F24S 10/80* (2018.05); *B01D 53/265* (2013.01); *B01D 2251/302* (2013.01); *B01D 2251/304* (2013.01); *B01D 2251/306* (2013.01); *B01D 2251/402* (2013.01); *B01D 2251/404* (2013.01); *B01D 2253/102* (2013.01); *B01D 2253/104* (2013.01); *B01D 2253/106* (2013.01); *B01D 2253/108* (2013.01); *B01D 2253/112* (2013.01); *B01D 2253/1124* (2013.01); *B01D 2253/20* (2013.01); *B01D 2253/202* (2013.01); *B01D 2257/80* (2013.01); *B01D 2258/06* (2013.01); *B01D 2259/40098* (2013.01); *F24S 10/95* (2018.05); *F24S 2020/17* (2018.05); *Y02E 10/44* (2013.01); *Y02E 10/60* (2013.01)

(56) References Cited

U.S. PATENT DOCUMENTS

| | | |
|---|---|---|
| 2,284,914 A | 6/1942 | Miller |
| 2,462,952 A | 3/1949 | Dunkak |
| 2,700,537 A | 1/1955 | Pennington |
| 2,761,292 A | 9/1956 | Coanda et al. |
| 3,102,532 A | 9/1963 | Shoemaker |
| 3,400,515 A | 9/1968 | Ackerman |
| 3,676,321 A | 7/1972 | Cummings et al. |
| 3,683,591 A | 8/1972 | Glav |
| 3,740,959 A | 6/1973 | Foss |
| 3,844,737 A | 10/1974 | Macriss et al. |
| 3,889,532 A | 6/1975 | Pilie et al. |
| 3,889,742 A | 6/1975 | Rush et al. |
| 4,054,124 A | 10/1977 | Knoos |
| 4,080,186 A | 3/1978 | Ockert |
| 4,095,997 A * | 6/1978 | Griffiths ............... H01L 31/042 126/634 |
| 4,117,831 A | 10/1978 | Bansal et al. |
| 4,134,743 A | 1/1979 | Macriss et al. |
| 4,136,672 A | 1/1979 | Hallanger |
| 4,146,372 A | 3/1979 | Groth et al. |
| 4,169,459 A | 10/1979 | Ehrlich |
| 4,185,969 A | 1/1980 | Bulang |
| 4,201,195 A | 5/1980 | Sakhuja |
| 4,219,341 A | 8/1980 | Hussmann |
| 4,222,244 A | 9/1980 | Meckler |
| 4,234,037 A | 11/1980 | Rogers et al. |
| 4,242,112 A | 12/1980 | Jebens |
| 4,285,702 A | 8/1981 | Michel et al. |
| 4,304,577 A | 12/1981 | Ito et al. |
| 4,315,599 A | 2/1982 | Biancardi |
| 4,334,524 A | 6/1982 | McCullough |
| 4,342,569 A | 8/1982 | Hussmann |
| 4,345,917 A | 8/1982 | Hussmann |
| 4,351,651 A | 9/1982 | Courneya |
| 4,374,655 A | 2/1983 | Grodzka et al. |
| 4,377,398 A | 3/1983 | Bennett |
| 4,398,927 A | 8/1983 | Asher et al. |
| 4,405,343 A | 9/1983 | Othmer |
| 4,433,552 A | 2/1984 | Smith |
| 4,478,210 A | 10/1984 | Sieradski |
| 4,722,192 A | 2/1988 | Koblitz et al. |
| 4,726,817 A | 2/1988 | Roger |
| 4,926,618 A | 5/1990 | Ratliff |
| 5,058,388 A | 10/1991 | Shaw et al. |
| 5,213,773 A | 5/1993 | Burris |
| 5,275,643 A | 1/1994 | Usui |
| 5,470,484 A | 11/1995 | McNeel |
| 5,579,647 A | 12/1996 | Calton et al. |
| 5,701,749 A | 12/1997 | Zakryk |
| 5,718,122 A | 2/1998 | Maeda |
| 5,729,981 A | 3/1998 | Markus et al. |
| 5,758,511 A | 6/1998 | Yoho et al. |
| 5,826,434 A | 10/1998 | Belding et al. |
| 5,846,296 A | 12/1998 | Krumsvik |
| 5,873,256 A | 2/1999 | Denniston |
| 5,989,313 A | 11/1999 | Mize |
| 6,029,467 A | 2/2000 | Moratalla |
| 6,156,102 A | 12/2000 | Contad et al. |
| 6,199,388 B1 | 3/2001 | Fischer, Jr. |
| 6,336,957 B1 | 1/2002 | Tsymerman |
| 6,447,583 B1 | 9/2002 | Thelen et al. |
| 6,490,879 B1 | 12/2002 | Lloyd et al. |
| 6,511,525 B2 | 1/2003 | Spletzer et al. |
| 6,513,339 B1 | 2/2003 | Kopko |
| 6,531,016 B1 * | 3/2003 | Weber .................. B41M 5/0358 156/289 |
| 6,557,365 B2 | 5/2003 | Dinnage et al. |
| 6,574,979 B2 | 6/2003 | Faqih |
| 6,644,060 B1 | 11/2003 | Dagan |
| 6,828,499 B2 | 12/2004 | Max |
| 6,869,464 B2 | 3/2005 | Klemic |
| 6,945,063 B2 | 9/2005 | Max |
| 6,957,543 B1 | 10/2005 | Reznik |
| 7,017,356 B2 | 3/2006 | Moffitt |
| 7,043,934 B2 | 5/2006 | Radermacher et al. |
| 7,178,355 B2 | 2/2007 | Moffitt |
| 7,251,945 B2 | 8/2007 | Tongue |
| 7,305,849 B2 | 12/2007 | Loffler et al. |
| 7,306,654 B2 | 12/2007 | King et al. |
| 7,478,535 B2 | 1/2009 | Turner, Jr. et al. |
| 7,740,765 B2 | 6/2010 | Mitchell |
| 7,866,176 B2 | 1/2011 | Vetrovec et al. |
| 7,905,097 B1 | 3/2011 | Fort |
| 7,926,481 B2 | 4/2011 | Edwards et al. |
| 8,075,652 B2 | 12/2011 | Melikyan |
| 8,118,912 B2 | 2/2012 | Rodriguez et al. |
| 8,187,368 B2 | 5/2012 | Shih |
| 8,196,422 B2 | 6/2012 | Ritchey |
| 8,328,904 B2 | 12/2012 | Griffiths et al. |
| 8,425,660 B2 | 4/2013 | Ike et al. |
| 8,506,675 B2 | 8/2013 | Ellsworth |
| 8,844,299 B2 | 9/2014 | Ferreira et al. |
| 8,876,956 B2 | 11/2014 | Ball et al. |
| 9,289,718 B2 | 3/2016 | Dahlback |
| 10,357,739 B2 | 7/2019 | Friesen et al. |
| 10,469,028 B2 | 11/2019 | Friesen et al. |
| 10,632,416 B2 | 4/2020 | Friesen et al. |
| 10,835,861 B2 | 11/2020 | Friesen et al. |
| 11,159,123 B2 | 10/2021 | Friesen et al. |
| 11,160,223 B2 | 11/2021 | Friesen et al. |
| 11,266,944 B2 | 3/2022 | Friesen et al. |
| 11,281,997 B2 | 3/2022 | Friesen et al. |
| 11,285,435 B2 | 3/2022 | Friesen et al. |
| 2002/0130091 A1 | 9/2002 | Ekberg et al. |
| 2003/0091881 A1 | 5/2003 | Eisler |
| 2003/0101161 A1 | 5/2003 | Ferguson et al. |
| 2004/0000165 A1 | 1/2004 | Max |
| 2004/0055309 A1 | 3/2004 | Bellows et al. |
| 2005/0044862 A1 | 3/2005 | Vetrovec et al. |
| 2005/0084415 A1 | 4/2005 | McVey et al. |
| 2005/0204914 A1 | 9/2005 | Boutall |
| 2005/0249631 A1 | 11/2005 | Schulz et al. |
| 2005/0284167 A1 | 12/2005 | Morgan |
| 2006/0017740 A1 | 1/2006 | Coleman |
| 2006/0032493 A1 | 2/2006 | Ritchey |

(56) References Cited

U.S. PATENT DOCUMENTS

| | | |
|---|---|---|
| 2006/0060475 A1 | 3/2006 | Applegate et al. |
| 2006/0112709 A1 | 6/2006 | Boyle |
| 2006/0130654 A1 | 6/2006 | King et al. |
| 2006/0288709 A1 | 12/2006 | Reidy |
| 2007/0028769 A1 | 2/2007 | Eplee et al. |
| 2007/0101862 A1 | 5/2007 | Tongue |
| 2007/0150424 A1 | 6/2007 | Igelnik |
| 2007/0274858 A1 | 11/2007 | Childers et al. |
| 2007/0295021 A1 | 12/2007 | Tyls et al. |
| 2008/0135495 A1 | 6/2008 | Sher |
| 2008/0168789 A1 | 7/2008 | Jones |
| 2008/0202944 A1 | 8/2008 | Santoli et al. |
| 2008/0224652 A1 | 9/2008 | Zhu et al. |
| 2008/0245092 A1 | 10/2008 | Forsberg et al. |
| 2008/0289352 A1 | 11/2008 | Parent |
| 2009/0025711 A1 | 1/2009 | Edwards et al. |
| 2009/0093916 A1 | 4/2009 | Parsonnet et al. |
| 2009/0173376 A1 | 7/2009 | Spencer et al. |
| 2009/0211276 A1 | 8/2009 | Forkosh |
| 2009/0223514 A1 | 9/2009 | Smith et al. |
| 2010/0083673 A1 | 4/2010 | Meritt |
| 2010/0116322 A1* | 5/2010 | Helbig .............. F24S 80/50 136/248 |
| 2010/0170499 A1 | 7/2010 | Bar |
| 2010/0192605 A1 | 8/2010 | Fang et al. |
| 2010/0212348 A1 | 8/2010 | Oh |
| 2010/0242507 A1 | 9/2010 | Meckler |
| 2010/0275629 A1 | 11/2010 | Erickson |
| 2010/0275775 A1 | 11/2010 | Griffiths et al. |
| 2010/0294672 A1 | 11/2010 | Gahr et al. |
| 2010/0300868 A1 | 12/2010 | Pirone |
| 2011/0048039 A1 | 3/2011 | Kohavi et al. |
| 2011/0056220 A1 | 3/2011 | Caggiano |
| 2011/0083458 A1 | 4/2011 | Takakura et al. |
| 2011/0132027 A1 | 6/2011 | Gommed et al. |
| 2011/0232485 A1 | 9/2011 | Ellsworth |
| 2011/0247353 A1 | 10/2011 | Metz |
| 2011/0296858 A1 | 12/2011 | Caggiano |
| 2012/0006193 A1 | 1/2012 | Roychoudhury |
| 2012/0125020 A1 | 5/2012 | Vandermeulen et al. |
| 2012/0227582 A1 | 9/2012 | Wamstad et al. |
| 2013/0227879 A1 | 9/2013 | Lehky |
| 2013/0269522 A1 | 10/2013 | DeValve |
| 2013/0312451 A1 | 11/2013 | Max |
| 2013/0318790 A1 | 12/2013 | Becze et al. |
| 2013/0319022 A1 | 12/2013 | Becze et al. |
| 2014/0034475 A1 | 2/2014 | Kamen et al. |
| 2014/0053580 A1 | 2/2014 | Ferreira et al. |
| 2014/0110273 A1 | 4/2014 | Bar-Or et al. |
| 2014/0138236 A1 | 5/2014 | White |
| 2014/0157985 A1 | 6/2014 | Scovazzo et al. |
| 2014/0173769 A1 | 6/2014 | Leyns et al. |
| 2014/0260389 A1 | 9/2014 | Sistla |
| 2014/0317029 A1 | 10/2014 | Matsuoka et al. |
| 2015/0033774 A1 | 2/2015 | Ferreira et al. |
| 2015/0136666 A1 | 5/2015 | Zamir et al. |
| 2015/0194926 A1 | 7/2015 | Bushong, Jr. |
| 2016/0073589 A1 | 3/2016 | McNamara |
| 2016/0118936 A1* | 4/2016 | Williams .............. H01L 31/0521 136/248 |
| 2016/0131401 A1 | 5/2016 | Otanicar et al. |
| 2016/0162456 A1 | 6/2016 | Munro et al. |
| 2016/0187287 A1 | 6/2016 | Tajiri et al. |
| 2016/0197364 A1 | 7/2016 | Rama |
| 2016/0244951 A1 | 8/2016 | Yui |
| 2016/0333553 A1 | 11/2016 | Dorfman |
| 2017/0013810 A1 | 1/2017 | Grabell |
| 2017/0024641 A1 | 1/2017 | Wierzynski |
| 2017/0203974 A1 | 7/2017 | Riedl et al. |
| 2017/0323221 A1 | 11/2017 | Chaudhuri et al. |
| 2017/0354920 A1 | 12/2017 | Friesen et al. |
| 2017/0371544 A1 | 12/2017 | Choi et al. |
| 2018/0043295 A1 | 2/2018 | Friesen et al. |
| 2018/0209123 A1 | 7/2018 | Bahrami et al. |
| 2019/0025273 A1 | 1/2019 | Brondum |
| 2019/0102695 A1 | 4/2019 | Biswas et al. |
| 2019/0171967 A1 | 6/2019 | Friesen et al. |
| 2019/0254243 A1 | 8/2019 | Friesen et al. |
| 2019/0336907 A1 | 11/2019 | Friesen et al. |
| 2019/0344214 A1 | 11/2019 | Friesen et al. |
| 2019/0372520 A1 | 12/2019 | Friesen et al. |
| 2020/0055753 A1 | 2/2020 | Minor et al. |
| 2020/0122083 A1 | 4/2020 | Friesen et al. |
| 2020/0124566 A1 | 4/2020 | Johnson et al. |
| 2020/0140299 A1 | 5/2020 | Friesen et al. |
| 2020/0209190 A1 | 7/2020 | Johnson et al. |
| 2020/0269184 A1 | 8/2020 | Friesen et al. |
| 2020/0283997 A1 | 9/2020 | Salloum et al. |
| 2020/0286997 A1 | 9/2020 | Wu et al. |
| 2020/0300128 A1 | 9/2020 | Friesen et al. |
| 2021/0062478 A1 | 3/2021 | Friesen et al. |
| 2021/0305935 A1 | 9/2021 | Friesen et al. |
| 2022/0039341 A1 | 2/2022 | Friesen et al. |
| 2022/0127172 A1 | 4/2022 | Friesen et al. |
| 2022/0136270 A1 | 5/2022 | Gamboa et al. |
| 2022/0156648 A1 | 5/2022 | Friesen et al. |

FOREIGN PATENT DOCUMENTS

| | | |
|---|---|---|
| CN | 1325854 | 7/2007 |
| CN | 101589282 | 11/2009 |
| CN | 102042645 | 5/2011 |
| CN | 102297503 | 12/2011 |
| CN | 102422089 | 4/2012 |
| CN | 102441320 | 5/2012 |
| CN | 102733451 | 10/2012 |
| CN | 202850099 | 4/2013 |
| CN | 103889892 | 6/2014 |
| CN | 203777907 | 8/2014 |
| CN | 104813107 | 7/2015 |
| CN | 204510348 U | 7/2015 |
| CN | 105531547 | 4/2016 |
| DE | 4215839 | 11/1993 |
| EP | 1139554 | 10/2001 |
| EP | 2305362 | 4/2011 |
| EP | 2326890 | 6/2011 |
| FR | 2813087 | 2/2002 |
| JP | H06142434 | 5/1994 |
| JP | H09285412 | 10/1997 |
| JP | 2002-126441 | 5/2002 |
| JP | 2003-148786 | 5/2003 |
| JP | 2012101169 | 5/2012 |
| KR | 20000003525 | 2/2000 |
| WO | 1999007951 | 2/1999 |
| WO | 2006129200 | 12/2006 |
| WO | 2007041804 | 4/2007 |
| WO | 2007051886 | 5/2007 |
| WO | 2008018071 | 2/2008 |
| WO | 2009043413 | 4/2009 |
| WO | 2012009024 | 1/2012 |
| WO | 2012128619 | 9/2012 |
| WO | 2012162760 | 12/2012 |
| WO | 2013026126 | 2/2013 |
| WO | 2013182911 | 12/2013 |
| WO | 2014085860 | 6/2014 |
| WO | 2015054435 | 4/2015 |
| WO | 2016053162 | 4/2016 |
| WO | 2016081863 | 5/2016 |
| WO | 2016138075 | 9/2016 |
| WO | 2016187709 | 12/2016 |
| WO | 2017177143 | 10/2017 |
| WO | 2017201405 | 11/2017 |
| WO | 2019014599 | 1/2019 |
| WO | 2019050861 | 3/2019 |
| WO | 2019050866 | 3/2019 |
| WO | 2019071202 | 4/2019 |
| WO | 2019113354 | 6/2019 |
| WO | 2019161339 | 8/2019 |
| WO | 2020082038 | 4/2020 |
| WO | 2020086621 | 4/2020 |
| WO | 2021154739 | 8/2021 |

OTHER PUBLICATIONS

(56) References Cited

OTHER PUBLICATIONS

Non-Final Office Action dated May 11, 2022 in U.S. Appl. No. 16/411,048.
Non-Final Office Action dated May 6, 2022 in U.S. Appl. No. 16/855,965.
Non-Final Office Action dated Mar. 2, 2022 in U.S. Appl. No. 16/630,824.
Notice of Allowance dated Feb. 4, 2022 in U.S. Appl. No. 16/644,465.
Notice of Allowance dated Mar. 7, 2022 in U.S. Appl. No. 16/644,487.
International Search Report and Written Opinion dated Feb. 16, 2022 in Application No. PCT/US2021/056910.
Non-Final Office Action dated Jan. 17, 2020 in U.S. Appl. No. 15/528,366.
Final Office Action dated Apr. 27, 2020 in U.S. Appl. No. 15/528,366.
Notice of Allowance dated Jun. 19, 2020 in U.S. Appl. No. 15/528,366.
Notice of Allowance dated Jun. 3, 2019 in U.S. Appl. No. 15/600,046.
Non-Final Office Action dated Feb. 5, 2019 in U.S. Appl. No. 15/482,104.
Notice of Allowance dated Jun. 27, 2019 in U.S. Appl. No. 15/482,104.
Non-Final Office Action dated Aug. 9, 2019 in U.S. Appl. No. 16/517,435.
Notice of Allowance dated Jan. 31, 2020 in U.S. Appl. No. 16/517,435.
Non-Final Office Action dated Jun. 1, 2020 in U.S. Appl. No. 16/167,295.
Final Office Action dated Apr. 13, 2021 in U.S. Appl. No. 16/167,295.
Non-Final Office Action dated May 15, 2020 in U.S. Appl. No. 16/791,895.
Final Office Action dated Oct. 15, 2020 in U.S. Appl. No. 16/791,895.
Non-Final Office Action dated Apr. 30, 2021 in U.S. Appl. No. 16/278,608.
Non-Final Office Action dated Jul. 20, 2021 in U.S. Appl. No. 16/211,896.
Non-Final Office Action dated Jul. 26, 2021 in U.S. Appl. No. 16/630,824.
Non-Final Office Action dated Aug. 24, 2021 in U.S. Appl. No. 16/657,935.
Notice of Allowance dated Oct. 20, 2021 in U.S. Appl. No. 16/820,587.
Notice of Allowance dated Nov. 10, 2021 in U.S. Appl. No. 16/211,896.
Final Office Action dated Dec. 20, 2021 in U.S. Appl. No. 16/791,895.
International Search Report and Written Opinion dated Apr. 29, 2016 in Application No. PCT/US2015/061921.
International Search Report and Written Opinion dated Aug. 16, 2017 in Application No. PCT/US2017/033540.
International Search Report and Written Opinion dated Jun. 19, 2017 in Application No. PCT/US2017/026609.
International Search Report and Written Opinion dated Dec. 3, 2018 in Application No. PCT/US2018/049411.
International Search Report and Written Opinion dated Dec. 3, 2018. Application No. PCT/US2018/049398.
International Search Report and Written Opinion dated Jan. 15, 2019 in Application No. PCT/US2018/054715.
International Search Report and Written Opinion dated Mar. 6, 2019 in Application No. PCT/US2018/042098.
International Search Report and Written Opinion dated Mar. 29, 2019 in Application No. PCT/US2018/064308.
International Search Report and Written Opinion dated Jun. 6, 2019 in Application No. PCT/US2019/018431.
International Search Report and Written Opinion dated Jul. 29, 2019 in Application No. PCT/US2019/32066.
International Search Report and Written Opinion dated Jan. 28, 2020 in Application No. PCT/US2019/057492.
International Search Report and Written Opinion dated Mar. 19, 2020 in Application No. PCT/US2019/057081.
International Search Report and Written Opinion dated Jun. 15, 2020 in Application No. PCT/US2020/029401.
International Search Report and Written Opinion dated Apr. 6, 2021 in Application No. PCT/US2021/015106.
European Search Report dated Jun. 7, 2019 in European Application No. 15825979.
European Search Report dated Jan. 28, 2020 in European Application No. 15825979.
Office Action dated Oct. 31, 2019 in Chinese Application No. 201780033378.3.
Office Action dated Apr. 6, 2021 in Chinese Application No. 201780033378.3.
Office Action dated Aug. 4, 2021 in Chinese Application No. 201780033378.3.
Office Action dated Nov. 1, 2021 in Chinese Application No. 201780033378.3.
Office Action dated Feb. 4, 2020 in Brazilian Patent Application No. 112017021842.9.
Office Action dated Apr. 28, 2021 in India Patent Application No. 20181704169.
Office Action dated Jul. 15, 2021 in Japanese Patent Application No. 2019-503636.
Office Action dated Jul. 29, 2021 in India Patent Application No. 202017005710.
Office Action dated Oct. 20, 2021 in Chinese Patent Application No. 201780044144.9.
Ali et al., "Desiccant Enhanced Nocturnal Radiative Cooling-Solar Collector System for Air Comfort Application in Hot Arid Areas," Int. J. of Thermal & Environmental Engineering, vol. 5, No. 1, pp. 71-82 (2013).
Anand et al., "Solar Cooling Systems for Climate Change Mitigation: A Review," Renewable and Sustainable Energy Reviews , vol. 41, pp. 143-161 (2015).
De Antonellis et al., "Simulation, Performance Analysis and Optimization of Desiccant Wheels," Energy and Buildings, vol. 42, No. 9, pp. 1386-1393 (2010).
Eriksson et al., "Diurnal Variations of Humidity and Ice Water Content in the Tropical Upper Troposphere," Atmos. Chem. Phys,. Vol. 10, pp. 11519-11533 (2010).
European Solar Thermal Industry Federation (ESTIF), "Key Issues for Renewable Heat in Europe (K4RES-H)," Solar Assisted Cooling -WP3, Task 3.5, Contract EIE/04/204/S07.38607, pp. 1-21 (2006).
Ge et al., "A Mathematical Model for Predicting the Performance of a Compound Desiccant Wheel (A Model of a Compound Desiccant Wheel)," Applied Thermal Engineering, vol. 30, No. 8, pp. 1005-1015 (2010).
Kassem et al., "Solar Powered Dehumidification Systems Using Desert Evaporative Coolers: Review," International Journal of Engineering and Advanced Technology {IJEAT), ISSN: 2249-8958, vol. 3, Issue 1 (2013).
Kolewar et al., "Feasability of Solar Desiccant Evaporative Cooling: A Review," International Journal of Scientific & Engineering Research, ISSN: 2229-5518, vol. 5, Issue 10 (2014).
La et al., "Technical Development of Rotary Desiccant Dehumidification and Air Conditioning: A Review," Renewable and Sustainable Energy Reviews, vol. 14, pp. 130-147 (2010).
Nia et al., "Modeling and Simulation of Desiccant Wheel for Air Conditioning," Energy and Buildings, vol. 38, No. 10, pp. 1230-1239 (2006).
Kozubal et al.," Desiccant Enhanced Evaporative Air-Conditioning {DEVap): Evaluation of a New Concept in Ultra Efficient Air Conditioning," National Renewal Energy Laboratory {NREL), Technical Report, NREL/TP-5500-49722 (2011).
Critoph et al., "Solar Energy for Cooling and Refrigeration," Engineering Department, University of Warwick, Coventry CV4 7AL, United Kingdom (1997).
Wahlgren, "Atmospheric Water Vapour Processor Designs for Potable Water Production: A Review," Wat. Res., vol. 35, No. 1, pp. 1-22 (2001).
Gad et al., "Application of a Solar Desiccant/Collector System for Water Recovery From Atmospheric Air," Renewal Energy, vol. 22, No. 4, pp. 541-556 (2001).
William et al., "Desiccant System for Water Production From Humid Air Using Solar Energy," Energy, vol. 90, pp. 1707-1720 (2015).

(56) References Cited

OTHER PUBLICATIONS

PV Performance Modeling Collaborative. (2014). Irradiance & Insolation. Accessed Aug. 18, 2021 at https://pvpmc.sandia.gov/modeling-steps/1-weather-design-inputs/irradiance-and-insolation-2/ (Year: 2014).

ACS. (2012). A Single-Layer Atmosphere Model. Accessed on Aug. 17, 2021 at https://www.acs.org/content/acs/en/ climatescience/atmosphericwarming/singlelayermodel.html (Year: 2012).

Materials Technology. (2010). UV Exposure Across Surface of Earth. Accessed Aug. 17, 2021 at http://www.drb-mattech.co.uk/uv%20map.html (Year: 2010).

\* cited by examiner

SOLAR THERMAL UNIT

CROSS-REFERENCE TO RELATED APPLICATIONS

This application is a continuation of, claims priority to and the benefit of, U.S. patent application Ser. No. 16/543,323 filed on Aug. 16, 2019 entitled "SOLAR THERMAL UNIT," which is a continuation of, claims priority to and the benefit of, U.S. patent application Ser. No. 15/482,104 filed on Apr. 7, 2017 entitled "SOLAR THERMAL UNIT," which claims priority to Provisional Application No. 62/319,721, filed Apr. 7, 2016 entitled "SOLAR THERMAL UNIT." The disclosures of the aforementioned Applications are incorporated herein by reference in their entirety.

SUMMARY

The present technology provides solar thermal units and methods of operating solar thermal units. Solar thermal units of the present technology are configured to convert solar insolation to thermal energy.

BRIEF DESCRIPTION OF THE DRAWINGS

Specific examples have been chosen for purposes of illustration and description, and are shown in the accompanying drawings, forming a part of the specification.

DETAILED DESCRIPTION

Figure 1:
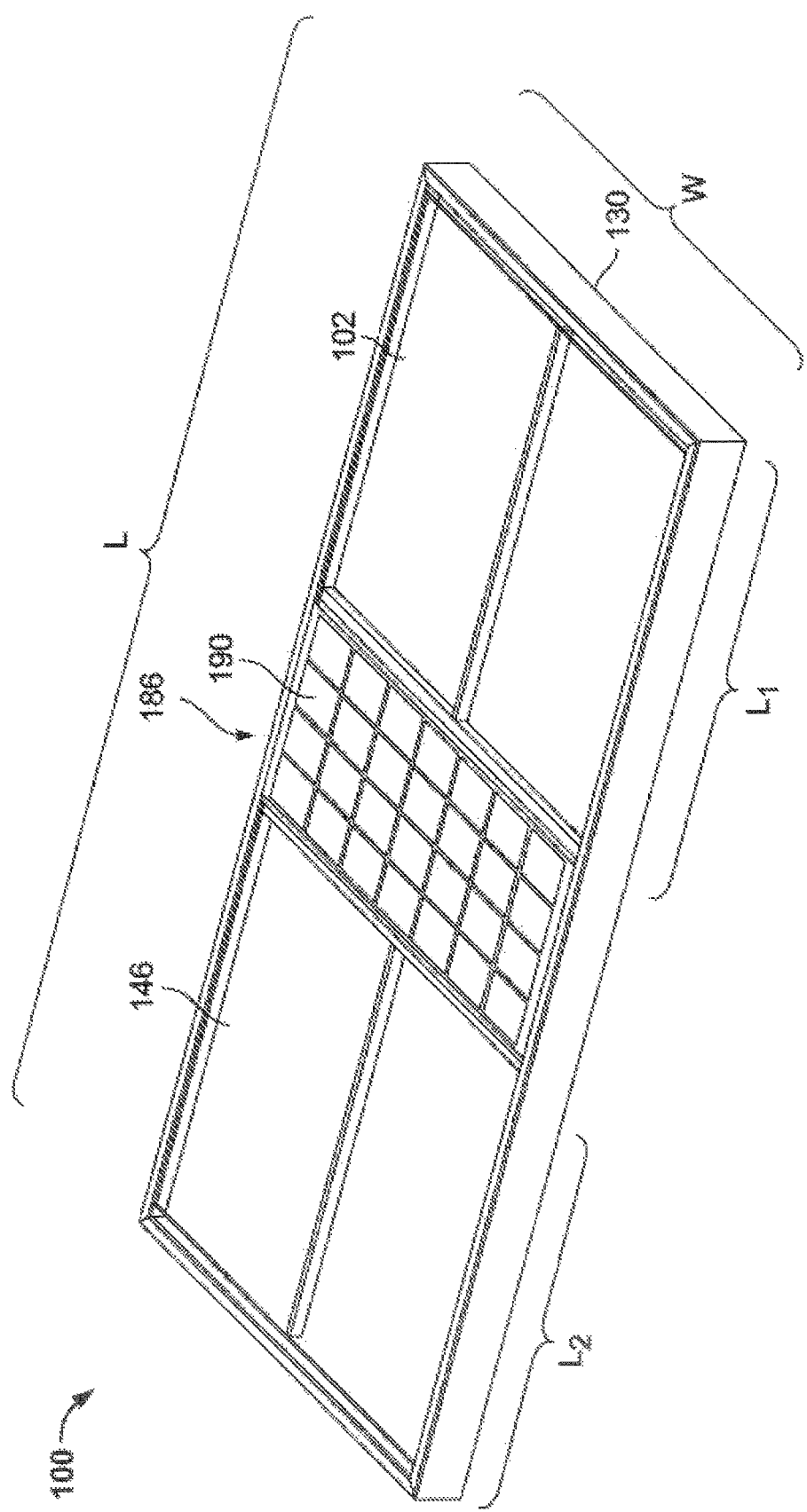
FIG. 1 is a perspective view of one example of a solar thermal unit of the present technology.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements. Likewise, a method that "comprises," "has," "includes," or "contains" one or more steps possesses those one or more steps, but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of or "consisting essentially of can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments described above and others are described below.

Solar thermal units of the present technology convert solar insolation to thermal energy by transferring energy from sunlight to a heat absorbing fluid that flows through the solar thermal unit. In at least some examples, solar thermal units of the present technology may be configured such that the temperature gradient increases along the depth of the solar thermal unit, in the direction that the heat absorbing fluid flows along either flow path from the inlet to the outlet. This may result in heat being substantially extracted or directed away from the upper layers of the system, such as a glazing layer that has contact with ambient air, keeping such layers relatively cool. In contrast, conventional solar thermal units tend to have an outer surface that is very hot. The configuration of the solar thermal unit may also result in heat from the solar insolation being directed to and retained in the most insulated areas of the unit, reducing radiative losses from the unit.

The present disclosure further provides an apparatus and method for generating energy and/or water with integrated solar thermal and photovoltaic conversion devices. Merely by way of example, the invention has been applied to a solar module and water generation devices, but it would be recognized that the invention has a much broader range of applicability.

FIGS. 1-4 illustrate one example of a solar thermal unit 100 of the present technology. The solar thermal unit 100 has a split-flow design having two fluid flow paths.

With respect to the first fluid flow path, on the right hand side of solar thermal unit 100, there is a first glazing layer 102 that has an outer surface 104 and an inner surface 106. The outer surface 104 of the first glazing layer 102 may be exposed to ambient air. The first fluid flow path of the solar thermal unit 100 also has a first porous light absorbing material layer 108, which is below and spaced apart from the first glazing layer 102. The first porous light absorbing material layer 108 has a top surface 110, a thickness 112, and a bottom surface 114. A heat absorbing fluid 116, or a portion thereof, may flow through the solar thermal unit 100 along the first fluid flow path from the inlet 120 to the outlet 122.

As shown, the first glazing layer 102 and the first porous light absorbing material layer 108 each have the same width W and length L1. In alternative examples, including as those shown in FIGS. 6 and 7, the first glazing layer may have a length L, which is greater that the length L1 of the first porous light absorbing material layer 108, and which may extend across the length of both fluid flow paths.

When it enters the solar thermal unit 100 through inlet 120, the heat absorbing fluid 116 may have an initial temperature, which may or may not be equal to the temperature of the ambient air outside the solar thermal unit 100, depending upon the application. After entering the solar thermal unit 100 through the inlet 120, at least part of the heat absorbing fluid 116 may flow along a first portion 118 of the first fluid flow path, which extends from the inlet 120 along the inner surface 106 of the first glazing layer 102. The heat absorbing fluid 116 may flow along the entire length L1 of the inner surface 106 of the first glazing layer 102 as it flows along the first portion 118 of the first fluid flow path.

The flow path of the heat absorbing fluid 116 along the first portion 118 of the first fluid flow path may be controlled by the structure geometry of the inlet 120, and/or the overall solar thermal unit 100. For example, inlet 120 may include one or more nozzles through which the heat absorbing fluid 116 flows into the solar thermal unit 100. The one or more nozzles may control the velocity and direction of the heat absorbing fluid 116 as it flows along the first portion 118 of the first fluid flow path. Alternatively, the solar thermal unit 100 may include at least one an interstitial layer, as described below.

Additionally, within the first portion 118 of the first fluid flow path, the heat absorbing fluid 116 may be evenly distributed across the entire width W of the inner surface 106 of the first glazing layer 102. As it travels along the first portion 118 of the first fluid flow path, the heat absorbing fluid 116 may collect heat from along the inner surface 106 of the first glazing layer 102. The temperature of the heat absorbing fluid 116 at the end of the first portion 118 of the first fluid flow path may thus be greater than the initial temperature of the heat absorbing fluid 116 at inlet 120. The amount of the temperature increase may be dependent upon several factors, including the level of insolation, ambient temperature, and inlet temperature.

After flowing through the first portion 118 of the first fluid flow path, the heat absorbing fluid 116 may then flow through a first transition 138 and then along a second portion 140 of the of the first fluid flow path. The second portion 140 of the first fluid flow path extends along the top surface 110 of the porous light absorbing material layer 108. At least a portion of the heat absorbing fluid 116 may flow along the entire length L1 of the top surface 110 of the porous light absorbing material layer 108 as it flows along the second portion 140 of the of the first fluid flow path. Additionally, within the second portion 140 of the of the first fluid flow path, the heat absorbing fluid 116 may be evenly distributed across the entire width W of the top surface 110 of the porous light absorbing material layer 108. As it travels along the second portion 140 of the of the first fluid flow path, the heat absorbing fluid 116 may collect heat from along the top surface 110 of the porous light absorbing material layer 108. The temperature of the heat absorbing fluid 116 at the end of the second portion 140 of the first fluid flow path may thus be greater than the temperature of the heat absorbing fluid 116 at the end of the first portion 118 of the first fluid flow path, as well as being greater than the initial temperature of the heat absorbing fluid 116 at inlet 120.

After flowing through the second portion 140 of the of the first fluid flow path, the heat absorbing fluid 116 may then flow along a third portion 142 of the first fluid path, through the thickness 112 of the porous light absorbing material layer 108. The heat absorbing fluid 116 may collect heat from within the first porous light absorbing material layer 108 as it flows along the third portion 142 of the first fluid path. The temperature of the heat absorbing fluid 116 at the end of the third portion 142 of the first fluid flow path may thus be greater than the temperature of the heat absorbing fluid 116 at the end of the second portion 140 of the first fluid flow path, as well as being greater than the initial temperature of the heat absorbing fluid 116 at inlet 120.

After flowing through the third portion 142 of the of the first fluid flow path, the heat absorbing fluid 116 may then flow along a fourth portion 144 of the first fluid path, along the bottom surface 114 porous light absorbing material layer 108 to the outlet 122, where the heat absorbing fluid may exit the solar thermal unit 100. The heat absorbing fluid 116 may collect heat from the bottom surface 114 porous light absorbing material layer 108, The heat absorbing fluid 116 may collect heat from the bottom surface 114 of the first porous light absorbing material layer 110, as well as from any other components, such as the insulation layer 130, that it contacts as it flows along the fourth portion 144 of the first fluid path. The temperature of the heat absorbing fluid 116 at the end of the fourth portion 144 of the first fluid flow path may thus be greater than the temperature of the heat absorbing fluid 116 at the end of the third portion 142 of the first fluid flow path, as well as being greater than the initial temperature of the heat absorbing fluid 116 at inlet 120.

The solar thermal unit 100 may also have an insulation layer 130, which may have at least a bottom 132 and a side wall 134. The sidewall 134 may extend around the entire perimeter of the solar thermal unit 100. The insulation layer 130 may be below and spaced apart from the first porous light absorbing material layer 108. The insulation layer 130 may be configured to provide a first flow channel 136 that forms part of the fourth portion 144 of the first fluid path. The fourth portion 144 of the first fluid path may flow along the first flow channel 136, beneath the porous light absorbing material layer 108, to the outlet 122.

Further, with respect to the first fluid flow path 118, the solar thermal unit 100 may have one or more interstitial layers, such as first interstitial layer 124, between the first glazing layer 102 and the first porous light absorbing material layer 108. Interstitial layer 124 may promote flow interaction with the first glazing layer 102 and result in increased heat extraction from the first glazing layer 102. As illustrated, the first interstitial layer 124 may be a glazing, and may be made of the same material or a different material that the first glazing layer 102, and/or may include one or more photovoltaic (PV) panels. The first interstitial layer 124 may have a top surface 126 and a bottom surface 128. The top surface 126 of the first interstitial layer 124 is below and spaced apart from the inner surface 106 of the first glazing layer 102 and the bottom surface 128 of the first interstitial layer 124 is above and spaced apart from the top surface 110 of the first porous light absorbing material layer 108.

Figure 3:
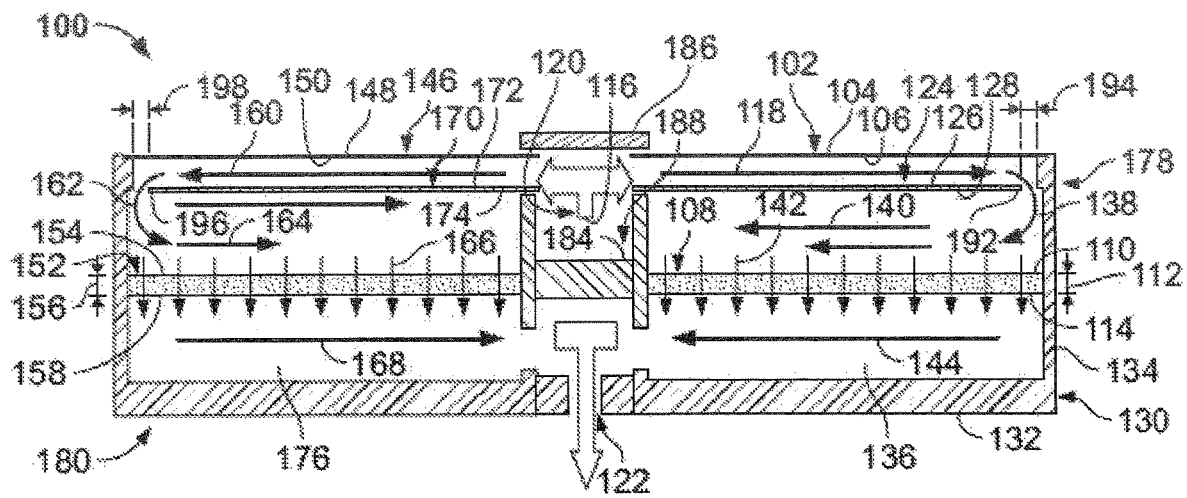
FIG. 3 is a cross-sectional side view of the solar thermal unit of FIG. 1, showing the flow path of the heat absorbing fluid.
Figure 4:
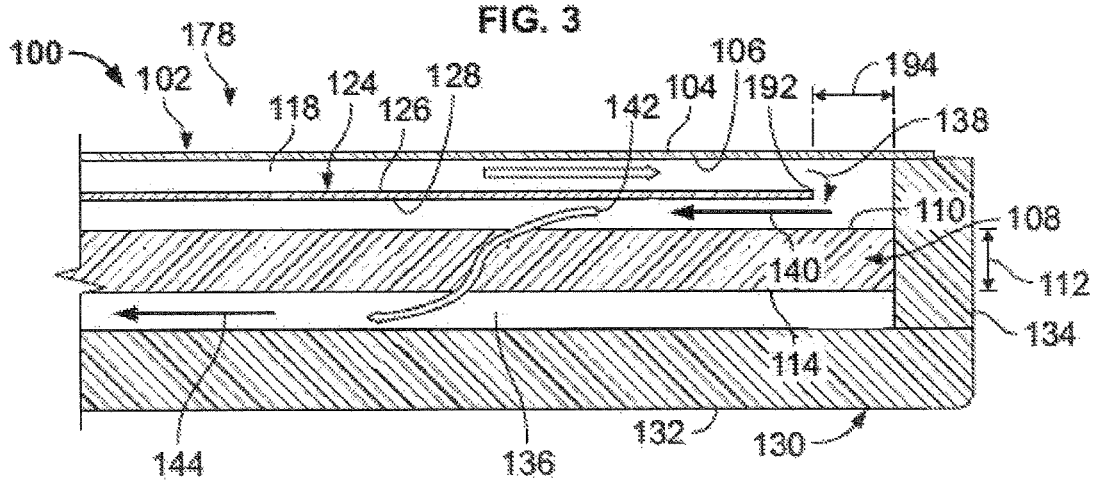
FIG. 4 is a cross-sectional side view of a portion of the solar thermal unit of FIG. 3, showing the flow path of the heat absorbing fluid.

In examples where the solar thermal unit 100 includes a first interstitial layer 124, the first transition 138 may include a turn in the first fluid path, around an end 192 of the first interstitial layer 124. As illustrated in FIGS. 3 and 4, the first glazing layer 102 has a length $L_1$, and the first interstitial layer 124 has a length that is less than the length of the first glazing layer 102. The shorter length of the first interstitial layer 124 creates a first gap 194 between the end 192 of the first interstitial layer 124 and the side wall 134 of the insulation layer 130. The turn of the first transition 138 may redirect the heat absorbing fluid 116 over an angle that may be up to about 180°, including being between about 90° and about 180°. The first interstitial layer 124 may have a width that is equal to the width W of the first glazing layer 102. In such an example, the first portion 118 of the first fluid path extends from the inlet 120 along the inner surface 104 of the first glazing layer 102 between the inner surface 104 of the first glazing layer 102 and the top surface 126 of the first interstitial layer 124, and the second portion 140 of the first fluid path extends between the bottom surface 128 of the first interstitial layer 124 and the top surface 110 of the first porous light absorbing material layer 108. The second portion 140 of the first fluid path may be in contact with the bottom surface 128 of the first interstitial layer 124, and may thereby collect heat from the first interstitial layer 124.

In examples where the solar thermal unit 100 includes a first interstitial layer 124, the heat absorbing fluid may also extract heat from the interstitial layer 124 as it flows along the first fluid flow path. For example, as the heat absorbing fluid 116 travels along the first portion 118 of the first fluid flow path, the heat absorbing fluid 116 may collect heat from along the inner surface 106 of the first glazing layer 102 and from the top surface 126 of the first interstitial layer 124. Also, as it travels along the second portion 140 of the first fluid flow path, the heat absorbing fluid 116 may collect heat from along the bottom surface 128 of the first interstitial layer 124 and along the top surface 110 of the porous light absorbing material layer 108. As discussed above, the temperature gradient of the heat absorbing fluid 116 may increase as the heat absorbing fluid flows along the first fluid flow path from the inlet 120 to the outlet 122, and the temperature of the heat absorbing fluid at the outlet 122 may be greater than the temperature of the heat absorbing fluid 116 at the inlet 120.

The second fluid flow path, on the left hand side of solar thermal unit 100, may have the same set of components as the first fluid flow path, and may be a mirror image of the first fluid flow path. As shown, the left hand side of solar thermal unit 100 includes second glazing layer 146 that has an outer surface 148 and an inner surface 150. The outer surface 148 of the second glazing layer 146 may be exposed to ambient air. The left hand side of solar thermal unit 100 also has a second porous light absorbing material layer 152, which is below and spaced apart from the second glazing layer 146. The second porous light absorbing material layer 152 has a top surface 154, a thickness 156, and a bottom surface 158. The heat absorbing fluid 116, or a portion thereof, may flow through the solar thermal unit 100 along the second fluid flow path from the inlet 120 to the outlet 122. As shown, the second glazing layer 146 and the second porous light absorbing material layer 152 each have the same width W and length $L_2$.

As discussed above, when it enters the solar thermal unit 100 through inlet 120, the heat absorbing fluid 116 may have an initial temperature. After entering the solar thermal unit 100 through the inlet 120, at least part of the heat absorbing fluid 116 may flow along a first portion 160 of the second fluid flow path, which extends from the inlet 120 along the inner surface 150 of the second glazing layer 146. The heat absorbing fluid 116 may flow along the entire length $L_2$ of the inner surface 150 of the second glazing layer 146 as it flows along the first portion 160 of the second fluid flow path. Additionally, within the first portion 160 of the second fluid flow path, the heat absorbing fluid 116 may be evenly distributed across the entire width W of the inner surface 106 of the first glazing layer 102. As it travels along the first portion 160 of the second fluid flow path, the heat absorbing fluid 116 may collect heat from along the inner surface 150 of the second glazing layer 146. The temperature of the heat absorbing fluid 116 at the end of the first portion 160 of the second fluid flow path may thus be greater than the initial temperature of the heat absorbing fluid 116 at inlet 120.

After flowing through the first portion 160 of the second fluid flow path, the heat absorbing fluid 116 may then flow through a second transition 162 and then along a second portion 164 of the of the second fluid flow path. The second portion 140 of the first fluid flow path extends along the top surface 154 of the second porous light absorbing material layer 152. At least a portion of the heat absorbing fluid 116 may flow along the entire length $L_1$ of the top surface 154 of the second porous light absorbing material layer 152 as it flows along the second portion 164 of the of the second fluid flow path. Additionally, within the second portion 164 of the of the second fluid flow path, the heat absorbing fluid 116 may be evenly distributed across the entire width W of the top surface 154 of the porous light absorbing material layer 152. As it travels along the second portion 164 of the of the second fluid flow path, the heat absorbing fluid 116 may collect heat from along the top surface 154 of the porous light absorbing material layer 152. The temperature of the heat absorbing fluid 116 at the end of the second portion 164 of the second fluid flow path may thus be greater than the temperature of the heat absorbing fluid 116 at the end of the first portion 160 of the second fluid flow path, as well as being greater than the initial temperature of the heat absorbing fluid 116 at inlet 120.

After flowing through the second portion 164 of the of the second fluid flow path, the heat absorbing fluid 116 may then flow along a third portion 166 of the second fluid path, through the thickness 156 of the second porous light absorbing material layer 152. The heat absorbing fluid 116 may collect heat from within the second porous light absorbing material layer 152 as it flows along the third portion 166 of the second fluid path. The temperature of the heat absorbing fluid 116 at the end of the third portion 166 of the second fluid flow path may thus be greater than the temperature of the heat absorbing fluid 116 at the end of the second portion 164 of the second fluid flow path, as well as being greater than the initial temperature of the heat absorbing fluid 116 at inlet 120.

After flowing through the third portion 142 of the of the second fluid flow path, the heat absorbing fluid 116 may then flow along a fourth portion 168 of the second fluid path, along the bottom surface 158 of the second porous light absorbing material layer 152 to the outlet 122, where the heat absorbing fluid 116 may exit the solar thermal unit 100. The heat absorbing fluid 116 may collect heat from the bottom surface 158 of the second porous light absorbing material layer 152, as well as from any other components, such as the insulation layer 130, that it contacts as it flows along the fourth portion 168 of the second fluid path. The temperature of the heat absorbing fluid 116 at the end of the fourth portion 168 of the second fluid flow path may thus be greater than the temperature of the heat absorbing fluid 116 at the end of the third portion 166 of the second fluid flow path, as well as being greater than the initial temperature of the heat absorbing fluid 116 at inlet 120.

The insulation layer 130 may be below and spaced apart from the second porous light absorbing material layer 152. The insulation layer 130 may be configured to provide a second flow channel 176 that forms part of the fourth portion 168 of the second fluid path. The fourth portion 168 of the second fluid path may flow along the second flow channel 176, beneath the second porous light absorbing material layer 152, to the outlet 122.

Further, with respect to the second fluid flow path, the solar thermal unit 100 may have one or more interstitial layers, such as second interstitial layer 170, between the second glazing layer 146 and the second porous light absorbing material layer 152. As illustrated, the second interstitial layer 170 may be a glazing or a different suitable material, and may be made of the same material or a different material that the second glazing layer 146 and/or may include one or more photovoltaic (PV) panels. The second interstitial layer 170 may have a top surface 172 and a bottom surface 174. The top surface 172 of the second interstitial layer 170 is below and spaced apart from the inner surface 150 of the second glazing layer 146 and the bottom surface 174 of the second interstitial layer 170 is above and spaced apart from the top surface 154 of the second porous light absorbing material layer 152.

In examples where the solar thermal unit 100 includes a second interstitial layer 170, the second transition 162 may include a turn in the second fluid path, around an end 196 of the second interstitial layer 170. As illustrated in FIGS. 3 and 4, the second glazing layer 146 has a length $L_2$, and the second interstitial layer 170 has a length that is less than the length $L_2$ of the first glazing layer 146. The shorter length of the second interstitial layer 170 creates a second gap 198 between the end 196 of the first interstitial layer 146 and the side wall 134 of the insulation layer 130. The turn of the second transition 162 may redirect the heat absorbing fluid 116 over an angle that may be up to about 180°, including being between about 90° and about 180°. The second interstitial layer 170 may have a width that is equal to the width W of the second glazing layer 146. In such an example, the first portion 160 of the second fluid path extends from the inlet 120 along the inner surface 150 of the second glazing layer 146 between the inner surface 150 of the second glazing layer 146 and the top surface 172 of the second interstitial layer 170, and the second portion 164 of the second fluid path extends between the bottom surface 174 of the second interstitial layer 170 and the top surface 154 of the second porous light absorbing material layer 152.

In examples where the solar thermal unit 100 includes a second interstitial layer 170, the heat absorbing fluid 116 may also extract heat from the second interstitial layer 170 as it flows along the second fluid flow path. For example, as it travels along the first portion 160 of the second fluid flow path, the heat absorbing fluid 116 may collect heat from along the inner surface 150 of the second glazing layer 146 and from the top surface 172 of the second interstitial layer 170. Also, as it travels along the second portion 164 of the of the second fluid flow path, the heat absorbing fluid 116 may collect heat from along the bottom surface 174 of the second interstitial layer 170 and along the top surface 154 of the porous light absorbing material layer 152. As discussed above, the temperature gradient of the heat absorbing fluid 116 may increase as the heat absorbing fluid flows along the second fluid flow path from the inlet 120 to the outlet 122, and the temperature of the heat absorbing fluid at the outlet 122 may be greater than the temperature of the heat absorbing fluid 116 at the inlet 120.

As shown in FIGS. 3 and 4, the first and second fluid flow paths may each be enclosed on the bottom and the sides by the insulation layer 130, and on the top by the first glazing layer 102 or the second glazing layer 146, respectively. The enclosed sections of the solar thermal unit 100 may provide sealed flow chambers, such that the heat absorbing fluid does not leak out of the solar thermal unit 100 as it flows from the inlet 120 to the outlet 122. For example, a first sealed flow chamber 178 may be provided that is bounded by the first glazing layer 102, the bottom 132 of the insulation 130, the side wall 134 of the insulation 130, and a wall of the plenum 184. The first sealed chamber encloses the first fluid path. Similarly, a second sealed flow chamber 180 may be provided that is bounded by the second glazing layer 146, the bottom 132 of the insulation 130, the side wall 134 of the insulation 130, and a wall of the plenum 184. The second sealed chamber encloses the second fluid path.

The solar thermal unit 100 may also have a protective housing 182 that surrounds and encloses at least a portion of the fluid flow paths and the components forming the fluid flow paths, including the insulation layer 130.

As can be seen in FIGS. 3 and 4, the split-flow solar thermal unit 100 may have a plenum 184 separating the first glazing layer 102 and first porous light absorbing material layer 108 from the second glazing layer 146 and the second porous light absorbing material layer 152. The plenum 184 may have a plenum cover 186 and an upper plenum chamber 188 below the plenum cover 186. The inlet 120 may be located in the plenum 184. The inlet 120 may be configured to evenly divide and direct inflowing heat absorbing fluid between the first fluid path and the second fluid path. The inlet may be further configured to cause the heat absorbing fluid to enter the upper plenum chamber 188.

In addition to creating thermal energy, some examples of solar thermal units of the present technology may also create electrical energy. In such examples, the electrical energy may be created by a photovoltaic panel (PV) 190 that includes one or more photovoltaic cells, which may comprise at least a portion of the plenum cover 186. The heat absorbing fluid 116 that enters the upper plenum chamber 188 from the inlet 122 may collect heat from the photovoltaic panel 190 before continuing along the first flow path or the second flow path. Because photovoltaic cells operate more efficiently when they are cooled, the heat absorbing fluid collecting heat from the photovoltaic panel 190 may maintain or improve the efficiency of the photovoltaic panel 190, as well as increasing the amount heat absorbed by the heat absorbing fluid. The rear side of the PV panel may be modified to promote flow interaction with the panel to enhance cooling of the panel. Additionally, the cell layout and wiring of the panel may be optimized to maximize the panels performance considering temperature gradients across the panel.

Figure 5:
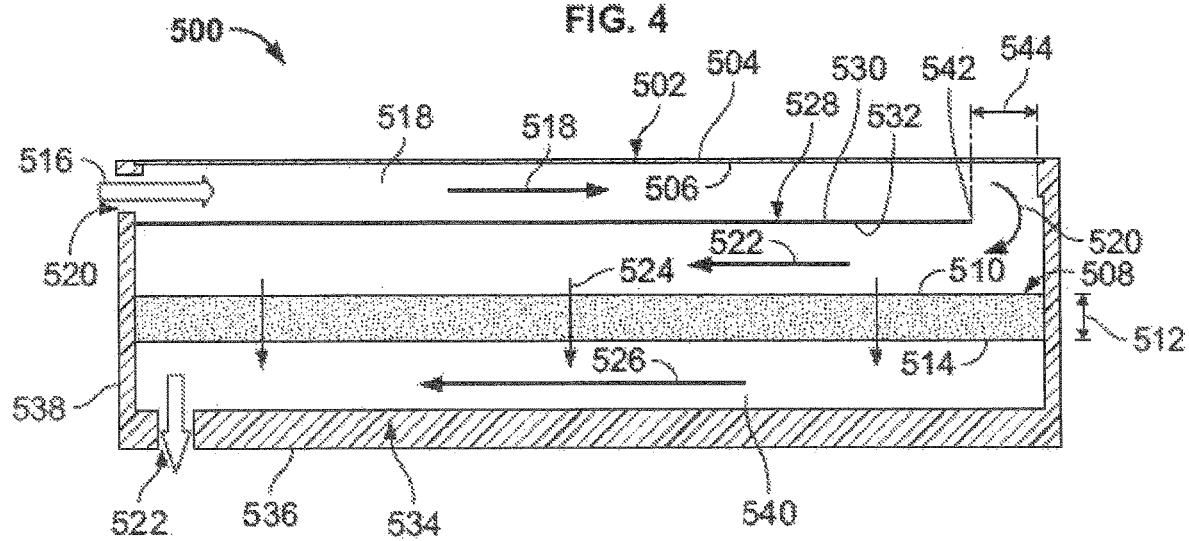
FIG. 5 is a cross-sectional side view of a second example of a solar thermal unit of the present technology.

One alternative example of a solar thermal unit 500 of the present technology, having a single fluid flow path, is illustrated in FIG. 5. In at least some examples, the solar thermal unit 500 may be configured such that the temperature gradient increases through the unit, along the fluid flow path from the inlet 520 to the outlet 522.

As shown, solar thermal unit 500 has a glazing layer 502 that has an outer surface 504 and an inner surface 506. The outer surface 504 of the glazing layer 502 may be exposed to ambient air. The solar thermal unit 500 also has a porous light absorbing material layer 508, which is below and spaced apart from the glazing layer 502. The porous light absorbing material layer 508 has a top surface 510, a thickness 512, and a bottom surface 514. A heat absorbing fluid 516 may flow through the solar thermal unit 500 along the fluid flow path from the inlet 520 to the outlet 522.

When it enters the solar thermal unit 500 through inlet 520, the heat absorbing fluid 516 may have an initial temperature, which may or may not be equal to the temperature of the ambient air outside the solar thermal unit 500, depending upon the application. After entering the solar thermal unit 500 through the inlet 520, at least part of the heat absorbing fluid 516 may flow along a first portion 518 of the fluid flow path, which extends from the inlet 520 along the inner surface 506 of the glazing layer 502. The heat absorbing fluid 516 may flow along the entire length of the inner surface 506 of the glazing layer 502 as it flows along the first portion 518 of the fluid flow path. Additionally, within the first portion 518 of the fluid flow path, the heat absorbing fluid 516 may be evenly distributed across the entire width of the inner surface 506 of the first glazing layer 502. As it travels along the first portion 518 of the fluid flow path, the heat absorbing fluid 116 may collect heat from along the inner surface 506 of the first glazing layer 502. The temperature of the heat absorbing fluid 516 at the end of the first portion 518 of the fluid flow path may thus be greater than the initial temperature of the heat absorbing fluid 516 at inlet 520.

After flowing through the first portion 518 of the fluid flow path, the heat absorbing fluid 516 may then flow through a transition 520 and then along a second portion 522 of the of the fluid flow path. The second portion 522 of the fluid flow path extends along the top surface 510 of the porous light absorbing material layer 508. At least a portion of the heat absorbing fluid 516 may flow along the entire length of the top surface 510 of the porous light absorbing material layer 508 as it flows along the second portion 522 of the of the fluid flow path. Additionally, within the second portion 522 of the of the fluid flow path, the heat absorbing fluid 516 may be evenly distributed across the entire width of the top surface 510 of the porous light absorbing material layer 508. As it travels along the second portion 522 of the of the fluid flow path, the heat absorbing fluid 516 may collect heat from along the top surface 510 of the porous light absorbing material layer 508. The temperature of the heat absorbing fluid 516 at the end of the second portion 522 of the fluid flow path may thus be greater than the temperature of the heat absorbing fluid 516 at the end of the first portion 518 of the fluid flow path, as well as being greater than the initial temperature of the heat absorbing fluid 516 at inlet 520.

After flowing through the second portion 522 of the of the fluid flow path, the heat absorbing fluid 516 may then flow along a third portion 524 of the first fluid path, through the thickness 512 of the porous light absorbing material layer 508. The heat absorbing fluid 516 may collect heat from within the porous light absorbing material layer 508 as if flows along the third portion 524 of the fluid path. The temperature of the heat absorbing fluid 516 at the end of the third portion 524 of the fluid flow path may thus be greater than the temperature of the heat absorbing fluid 516 at the end of the second portion 522 of the fluid flow path, as well as being greater than the initial temperature of the heat absorbing fluid 516 at inlet 520.

After flowing through the third portion 524 of the of the fluid flow path, the heat absorbing fluid 516 may then flow along a fourth portion 526 of the fluid path, along the bottom surface 514 porous light absorbing material layer 508 to the outlet 522, where the heat absorbing fluid may exit the solar thermal unit 500. The heat absorbing fluid 516 may collect heat from the bottom surface 514 porous light absorbing material layer 508, as well as from any other components, such as the insulation layer 534, that it contacts as if flows along the fourth portion 526 of the fluid path. The temperature of the heat absorbing fluid 516 at the end of the fourth portion 526 of the fluid flow path may thus be greater than the temperature of the heat absorbing fluid 516 at the end of the third portion 524 of the fluid flow path, as well as being greater than the initial temperature of the heat absorbing fluid 516 at inlet 520.

The solar thermal unit 500 may also have an insulation layer 534, which may have a bottom 536 and a side wall 538. The insulation layer 534 may be below and spaced apart from the porous light absorbing material layer 508. The insulation layer 534 may be configured to provide a first flow channel 540 that forms part of the fourth portion 526 of the fluid path. The fourth portion 526 of the fluid path may flow along the first flow channel 540, beneath the porous light absorbing material layer 508, to the outlet 522.

Further, the solar thermal unit 500 may have at least one interstitial layer, such as interstitial layer 528, between the glazing layer 502 and the porous light absorbing material layer 508. The interstitial layer 528 may be a glazing or a different suitable material, and may be made of the same material or a different material that the glazing layer 202. The interstitial layer 528 may have a top surface 530 and a bottom surface 532. The top surface 530 of the interstitial layer 528 is below and spaced apart from the inner surface 506 of the glazing layer 502 and the bottom surface 532 of the interstitial layer 528 is above and spaced apart from the top surface 510 of the porous light absorbing material layer 508.

In examples where the solar thermal unit 500 includes an interstitial layer 528, the transition 520 may include a turn in the first fluid path, around an end 542 of the interstitial layer 528. As illustrated in FIG. 5, the glazing layer 502 has a length and the interstitial layer 528 has a length that is less than the length of the glazing layer 502. The shorter length of the interstitial layer 528 creates a first gap 544 between the end 542 of the interstitial layer 528 and the side wall 538 of the insulation layer 534. The turn of the transition 520 may redirect the heat absorbing fluid 516 over an angle that may be up to about 180°, including being between about 90° and about 180°. The interstitial layer 528 may have a width that is equal to the width of the glazing layer 502. In such an example, the first portion 518 of the fluid path extends from the inlet 520 along the inner surface 504 of the glazing layer 502 between the inner surface 504 of the glazing layer 502 and the top surface 530 of the interstitial layer 528, and the second portion 522 of the fluid path extends between the bottom surface 532 of the interstitial layer 528 and the top surface 510 of the porous light absorbing material layer 508. The second portion 522 of the fluid path may be in contact with the bottom surface 532 of the interstitial layer 528, and may thereby collect heat from the first interstitial layer 528.

In examples where the solar thermal unit 500 includes a first interstitial layer 528, the heat absorbing fluid may also extract heat from the interstitial layer 528 as it flows along the fluid flow path. For example, as the heat absorbing fluid 516 travels along the first portion 518 of the fluid flow path, the heat absorbing fluid 516 may collect heat from along the inner surface 506 of the first glazing layer 502 and from the top surface 530 of the first interstitial layer 528. Also, as it travels along the second portion 522 of the of the fluid flow path, the heat absorbing fluid 516 may collect heat from along the bottom surface 532 of the first interstitial layer 528 and along the top surface 510 of the porous light absorbing material layer 508. As discussed above, the temperature gradient of the heat absorbing fluid 516 may increase as the heat absorbing fluid flows along the first fluid flow path from the inlet 520 to the outlet 522, and the temperature of the heat absorbing fluid at the outlet 522 may be greater than the temperature of the heat absorbing fluid 516 at the inlet 520.

Figure 6:
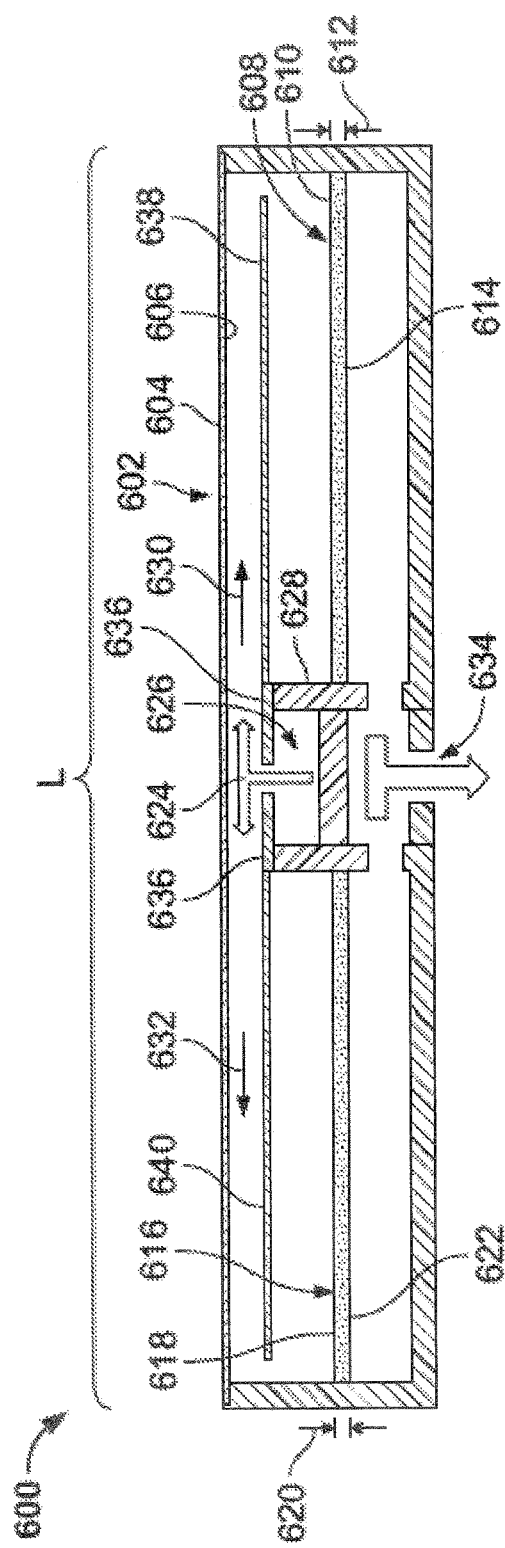
FIG. 6 is a cross-sectional side view of a third example of a solar thermal unit of the present technology.
Figure 7:
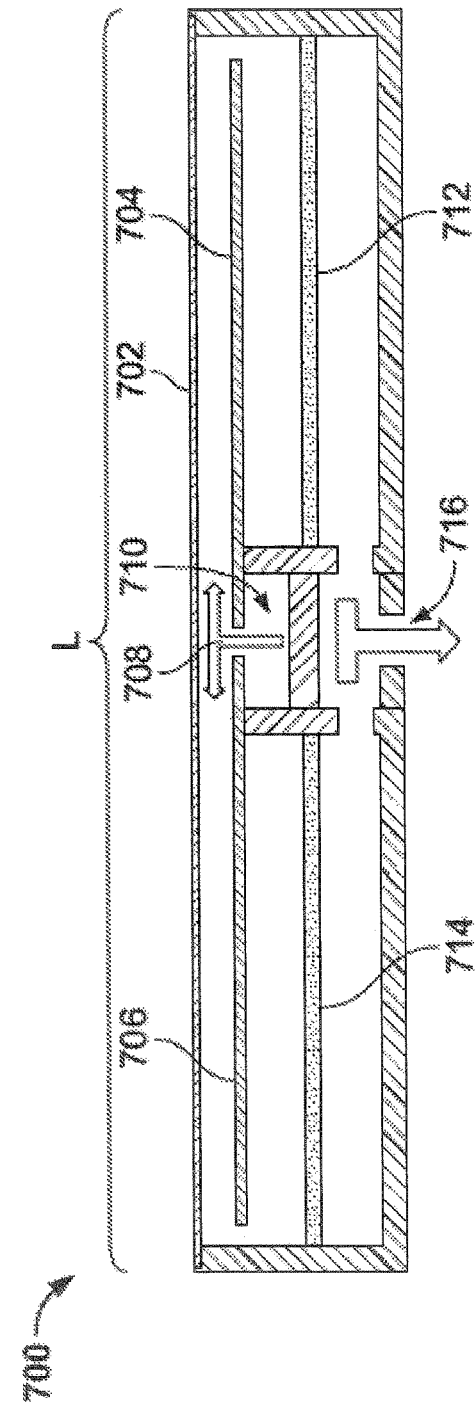
FIG. 7 is a cross-sectional side view of a fourth example of a solar thermal unit of the present technology.

Additional alternative examples of solar thermal units 600 and 700 of the present technology are shown in FIGS. 6 and 7, respectively.

As shown in FIG. 6, solar thermal unit 600 has two fluid flow paths similar to those illustrated and discussed above with respect to FIGS. 1-4. Instead of having a second glazing layer, however, solar thermal unit 600 has only a first glazing layer 602, which has a length L and extends across the top of both fluid flow paths. As shown, solar thermal unit 600 has a first glazing layer having an outer surface 604 and an inner surface 606. The outer surface 604 of the first glazing layer 602 may be exposed to ambient air. Solar thermal unit 600 also has a first porous light absorbing material layer 608 below and spaced apart from the first glazing layer 602 on a first side of the solar thermal unit 600. The first porous light absorbing material layer 608 has a top surface 610, a thickness 612, and a bottom surface 614. Solar thermal unit 600 also has a second porous light absorbing material layer 616 below and spaced apart from the first glazing layer 602 on a second side of the solar thermal unit 600, opposite the first side of the solar thermal unit 600. The second porous light absorbing material layer 616 has a top surface 618, a thickness 620, and a bottom surface 622. Solar thermal unit 600 further has a first interstitial layer 638 and a second interstitial layer 640.

Heat absorbing fluid 624 enters the solar thermal unit 600 through an inlet 626 in the plenum 628, which separates the first porous light absorbing material layer 608 from the second porous light absorbing material layer 616. A first portion, which may be half, of the heat absorbing fluid 624 flows along the first fluid flow path 630 from inlet 626 along the inner surface 606 of the first glazing layer and then through the thickness of the first porous light absorbing material layer 608 to the outlet 634. A second portion, which may also be half, of the heat absorbing fluid 624 flows along the second fluid flow path 632 from the inlet 626 along the inner surface 606 of the first glazing layer and then through the thickness of the second porous light absorbing material layer 616 to the outlet 634.

The flow of the heat absorbing fluid 624 through solar thermal unit 600 is the same as, or substantially the same as, the flow along the fluid paths of solar thermal unit 100, described above. However, in solar thermal unit 600, the plenum cover 636 is below and spaced apart from the first glazing layer 602, which may be even with the first and second interstitial layers 638 and 640. As shown, the plenum cover 636 may include one or more photovoltaic cells. The inlet 626 may be configured to evenly divide and direct inflowing heat absorbing fluid 624 between the first fluid path and the second fluid path. The inlet 626 may be further configured to cause the heat absorbing fluid to enter the plenum below the plenum cover 636, and then flow over the plenum cover 636 as it is divided along each flow path. Such a configuration may allow the heat absorbing fluid 624 to collect heat from the beneath and above the plenum cover 636, and any of the one or more PV panels that are part of the plenum cover 636.

As shown in FIG. 7, solar thermal unit 700 is similar in structure and flow to solar thermal unit 600. Solar thermal unit 700 has a first glazing layer 702 having a length L and extends across the top of both fluid flow paths. In this example, a first end of each of the first interstitial layer 704 and the second interstitial layer 706 may act as the plenum cover. Moreover, each of the first interstitial layer 704 and the second interstitial layer 706 may include one or more PV panels. In this example, the area of PV panel that can be included is greater than the area of PV panel in the other illustrated examples. The heat absorbing fluid 708 can enter the solar thermal unit 700 through inlet 710, below the portion of each of the first and second interstitial layers 704 and 706 acting as the plenum cover. The heat absorbing fluid may then divide and flow along each of the fluid flow paths, gathering heat from the top of the PV panels of the first interstitial layer 704 and the second interstitial layer 706, and then from the bottom of the PV panels of the first interstitial layer 704 and the second interstitial layer 706, before flowing through the first and second porous light absorbing material layers 712 and 714 to the outlet 716. In solar thermal unit 700, it may be advantageous for the thickness of the first and second interstitial layers 704 and 706 acting as the plenum cover to be reduced as much as practical, and for the thickness of the first and second porous light absorbing material layers 712 and 714 to be increased.

Figure 12:
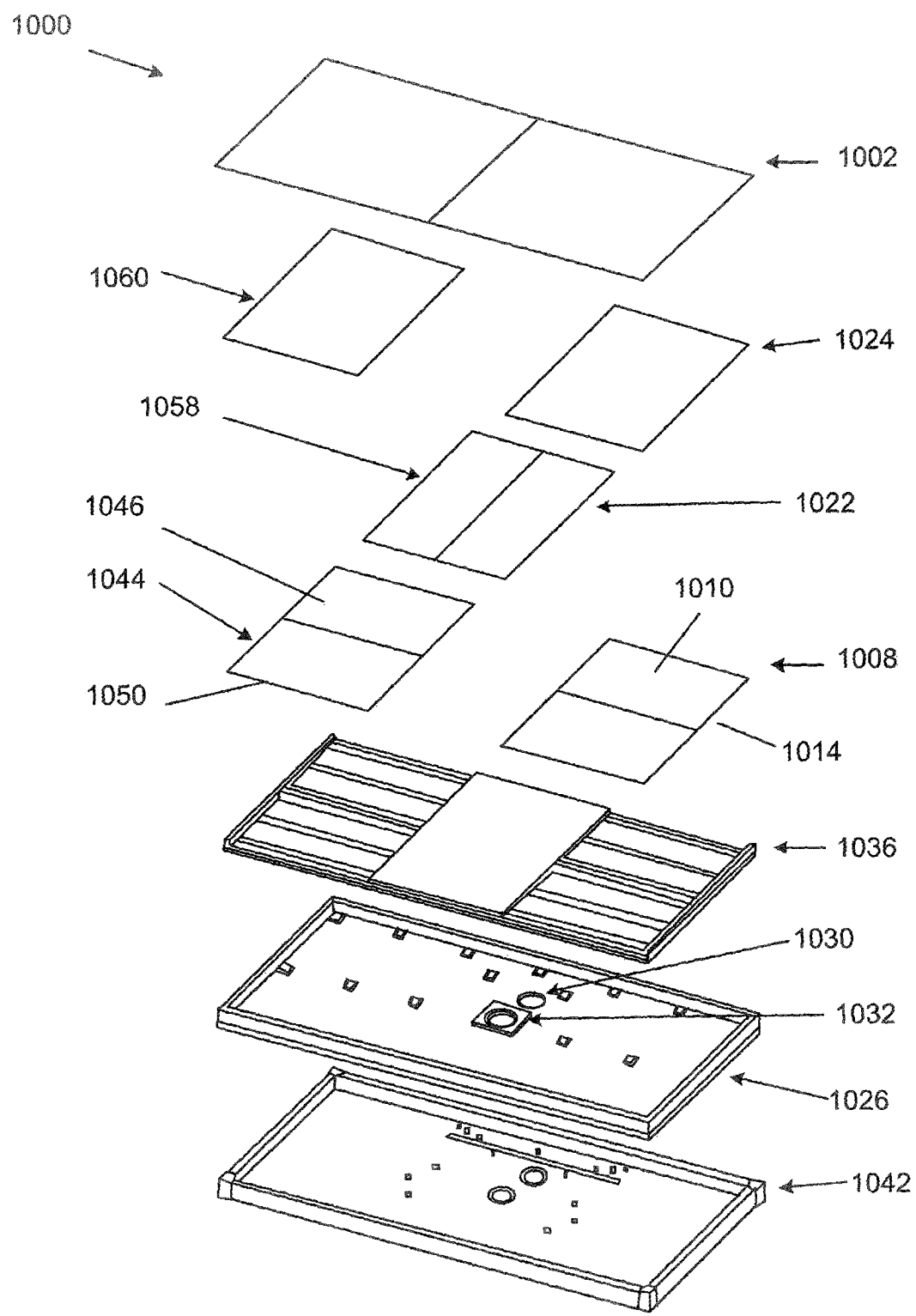
FIG. 12 is an exploded view of a fifth example of a solar thermal unit of the present technology.
Figure 13:
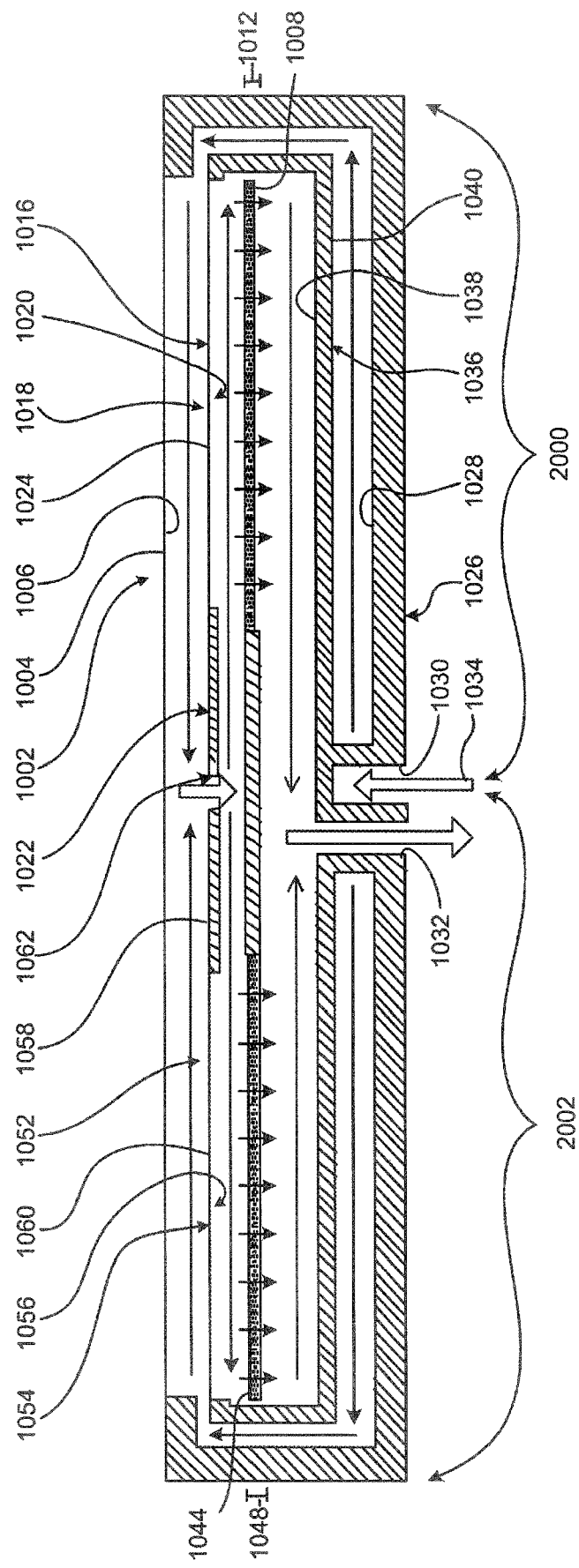
FIG. 13 is a is a cross-sectional side view of the solar thermal unit of FIG. 12, showing the flow path of the heat absorbing fluid.

FIGS. 12-13 illustrate a fifth example of a solar thermal unit 1000 of the present technology. The solar thermal unit 1000 has a split-flow design having two fluid flow paths, a first fluid flow path on the right and a second fluid flow path on the left. It should be understood that the second fluid flow path may have the same set of components as the first fluid flow path, and may be a mirror image of the first fluid flow path. The flow paths of this design are altered as compared to the flow paths of solar thermal unit 100, with the heat absorbing fluid flowing first to the outer edges of the unit and then flowing along the bottom surface of the first glazing layer towards the center of the unit.

A shown, solar thermal unit 1000 includes a first glazing layer 1002 that extends across both the first fluid flow path 2000 and the second fluid flow path 2002. The first glazing layer 1002 has an outer surface 1004 and an inner surface 1006. The outer surface 1004 of the first glazing layer 1002 may be exposed to ambient air.

The first fluid flow path 2000 of the solar thermal unit 1000 has a first porous light absorbing material layer 1008, which is below and spaced apart from the first glazing layer 1002. The first porous light absorbing material layer 1008 has a top surface 1010, a thickness 1012, and a bottom surface 1014.

The first fluid flow path 2000 of the solar thermal unit 1000 also has a first interstitial layer 1016 between the first glazing layer 1002 and the first porous light absorbing material layer 1008, the first interstitial layer 1016 has a top surface 1018 and a bottom surface 1020. The top surface 1018 of the first interstitial layer 1016 is below and spaced apart from the inner surface 1006 of the first glazing layer 1002, and the bottom surface 1020 of the first interstitial layer 1016 is above and spaced apart from the top surface 1010 of the first porous light absorbing material layer 1008. The first interstitial layer may include a PV panel 1022 and a second glazing layer 2024.

The second fluid flow path 2002 of the solar thermal unit 1000 has a second porous light absorbing material layer 1044, which is below and spaced apart from the first glazing layer 1002. The second porous light absorbing material layer 1044 has a top surface 1046, a thickness 1048, and a bottom surface 1050.

The second fluid flow path 2002 of the solar thermal unit 1000 also has a second interstitial layer 1052 between the first glazing layer 1002 and the second porous light absorbing material layer 1044, the second interstitial layer 1052 has a top surface 1054 and a bottom surface 1056. The top surface 1054 of the second interstitial layer 1052 is below and spaced apart from the inner surface 1006 of the first glazing layer 1002, and the bottom surface 1056 of the second interstitial layer 1052 is above and spaced apart from the top surface 1046 of the second porous light absorbing material layer 1044. The second interstitial layer may include a PV panel 1058 and a third glazing layer 1060. Additionally, the first interstitial layer 1016 and the second interstitial layer 1052 may be spaced apart to provide a first transition 1062 through which the heat absorbing fluid of the first and second flow paths can pass.

The solar thermal unit 1000 also includes an inlet plenum 1026, which has an inner surface 1028. The inlet plenum has an inlet 1030, through which the heat absorbing fluid 1034 enters the solar thermal unit 1000, and an outlet 1032, through which the heat absorbing fluid 1034 exits the solar thermal unit 1000. The solar thermal unit, including the inlet 1030, may be configured to divide the heat absorbing fluid evenly, so that a first half of the heat absorbing fluid flows along the first fluid flow path 2000 and a second half of the heat absorbing fluid flows along the second fluid flow path 2002. Balancing the flow by providing even distribution between the flow paths can reduce or eliminate hot spots that can occur on the first glazing layer, which can reduce heat loss through the first glazing layer and improve efficiency.

The solar thermal unit 1000 further includes an insulation layer 1036 between the inlet plenum 1026 and the first porous light absorbing material layer 1008. The insulation layer has a top surface 1038 and a bottom surface 1040.

The solar thermal unit 1000 may include a protective housing 1042, which may surrounds and encloses at least a portion of the fluid flow paths and the components forming the fluid flow paths, including the inlet plenum 1026.

The heat absorbing fluid 1034 enters the solar thermal unit 1000 through the inlet 1030, and is divided to flow along the first fluid flow path and the second fluid flow path.

As shown in FIG. 13, the first fluid flow path 2000 flows from the inlet 1030, to the right, between the inner surface 1028 of the inlet plenum 1026 and the bottom surface 1040 of the insulation layer 1036. Next, the first fluid flow path 2000 flows along the inner surface 1006 of the first glazing layer 1002. The heat absorbing fluid absorbs heat from along the inner surface 1006 of the first glazing layer 1002, as well as from along the top surface 1018 of the first interstitial layer 1016, including any PV panel that is a component thereof. Accordingly, the temperature of the heat absorbing fluid after flowing along the inner surface 1006 of the first glazing layer 1002 is greater than the temperature of the heat absorbing fluid at the inlet 1030.

Next, the first fluid flow path 2000 flows through a first transition 1062, which is shown as being the space between the spaced apart first interstitial layer 1016 and the second interstitial layer 1052. At and within the first transition 1062, heat absorbing fluid of the first flow path may intermingle with heat absorbing fluid of the second flow path, before the flow splits to continue along the two fluid flow paths. The first transition 1062 may be configured to join the first and second flow paths, and then split the first and second flow paths so that the heat absorbing fluid is divided evenly between the two fluid flow paths.

Next, the first fluid flow path 2000 flows along the bottom surface of the first interstitial layer and the top surface of the first porous light absorbing material layer 1008, and the and then through the thickness 1012 of the first porous light absorbing material layer 1008 to the outlet 1032. The heat absorbing fluid 1034 flowing along the first fluid flow path 2000 absorbs heat from along the bottom surface of the first interstitial layer, including any PV panel that is a component thereof, and the top surface of the first porous light absorbing material layer 1008. The heat absorbing fluid flowing along the first fluid flow path 2000 also absorbs heat from within the thickness of the first porous light absorbing material layer 1008. Accordingly, the temperature of the heat absorbing fluid after flowing through the first porous light absorbing material layer 1008 may be greater than the temperature of the heat absorbing fluid 1034 at the inlet 1030.

The second fluid flow path 2002 flows from the inlet 1030, to the left, between the inner surface 1028 of the inlet plenum 1026 and the bottom surface 1040 of the insulation layer 1036. Next, the second fluid flow path 2002 flows along the inner surface 1006 of the first glazing layer 1002. The heat absorbing fluid absorbs heat from along the inner surface 1006 of the first glazing layer 1002, as well as from along the top surface 1054 of the second interstitial layer 1052. Accordingly, the temperature of the heat absorbing fluid after flowing along the inner surface 1006 of the first glazing layer 1002 is greater than the temperature of the heat absorbing fluid at the inlet 1030.

Next, the second fluid flow path 2002 flows through the first transition 1062, between the spaced apart first interstitial layer 1016 and the second interstitial layer 1052. At and within the first transition 1062, heat absorbing fluid of the second flow path may intermingle with heat absorbing fluid of the first flow path, before the flow splits to continue along the two fluid flow paths.

Next, the second fluid flow path 2002 flows along the bottom surface 1056 of the second interstitial layer 1052 and the top surface 1046 of the second porous light absorbing material layer 1044, and the and then through the thickness 1048 of the first porous light absorbing material layer 1044 to the outlet 1032. The heat absorbing fluid 1034 flowing along the second fluid flow path 2002 absorbs heat from along the bottom surface 1056 of the second interstitial layer 1052 and the top surface 1046 of the first porous light absorbing material layer 1044. The heat absorbing fluid flowing along the second fluid flow path 2002 also absorbs heat from within the thickness 1048 of the second porous light absorbing material layer 1044. Accordingly, the temperature of the heat absorbing fluid after flowing through the second porous light absorbing material layer 1044 may be greater than the temperature of the heat absorbing fluid 1034 at the inlet 1030.

As discussed above, the temperature gradient of the heat absorbing fluid 1034 may increase as the heat absorbing fluid flows along either the first fluid flow path 2000 or the second fluid flow path, from the inlet 1030 to the outlet 1032, and the temperature of the heat absorbing fluid at the outlet 1032 may be greater than the temperature of the heat absorbing fluid 1034 at the inlet 1030.

Materials

The specific examples of solar thermal units described with respect to FIGS. 1-5 above use air, specifically ambient air, as the heat absorbing fluid. Ambient air normally contains a mixture of gaseous components, including oxygen and nitrogen. In alternative examples, other heat absorbing fluids could be used, which may be in either gaseous or liquid form. Some non-limiting examples of other heat absorbing fluids include water, helium, argon, water, steam, and mixtures of these components with each other or with other components.

Glazing layers for use in solar thermal units of the present technology are transparent layers configured to allow sunlight to penetrate into the solar thermal unit through the glazing layer and into the porous light absorbing layer. A glazing layer may be made of any suitable material, including for example: glass, acrylic, FEP, a polymer, a polycrystalline material, derivatives of any of the foregoing, or combinations of any of the foregoing. When glass is used, the glass may be soda lime, iron free or low iron glass. The infrared (IR) opacity of the glazing layer is not as critical in solar thermal units of the present technology, where the air, or other heat absorbing fluid, flows through the solar thermal unit, as compared to typical solar thermal units having stagnant air. Glazing layers may also be surface treated or coated to promote transmission and/or reduce radiative losses through the glazing.

Figure 8:
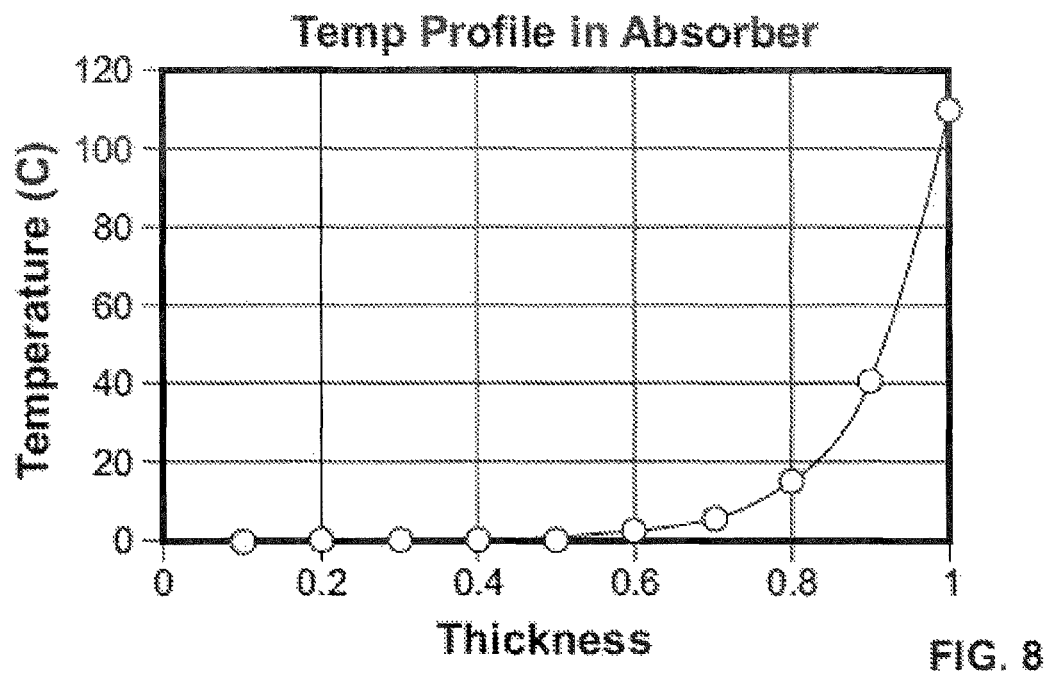
FIG. 8 is a graph of a non-linear temperature profile in the absorber a solar thermal unit of the present technology.

Porous heat absorbing layers for use in solar thermal units of the present technology may be made of any suitable material that absorbs heat and configured for flow-through of the heat absorbing fluid, including for example: metals, mineral wool, and thermally stable polymers. In some examples, the porous heat absorbing layer may be made of a black material, or have a black coating or selective film applied to the top surface thereof. A porous heat absorbing layer of the present technology may include a plurality of sub-layers, where each sub-layer captures a percentage of the heat absorbed by the overall porous heat absorbing layer. The view factor of each sub-layer of the porous heat absorbing layer directly affects the percentage of the heat captured by each layer through the thickness from the top surface to the bottom surface. It may be desirable to configure the porous heat absorbing layer to have an optimized thermal mass, which may be a small as practicable, in order to reduce the time period needed for the porous heat absorbing layer to reach a desired temperature. It may also be desirable for the porous heat absorbing layer to be configured such that it has a non-linear temperature profile, such as illustrated in FIG. 8, where the temperature at any given time during operation of the solar thermal unit is a lower at the top surface, and in the initial layers, and increases in the lower layers to a maximum near or at the bottom surface.

Insulation layers for use in solar thermal units of the present technology may be made of any suitable material that functions to reduce the loss of radiated heat from the solar thermal unit.

Housing for use in solar thermal units of the present technology may be made of any suitable material, including for example galvanized steel.

Heat Transfer and Absorption

A computational simulation tool was developed to solve the complete system of equations describing heat transfer in the solar thermal unit. The equations are solved simultaneously for each component in the system in an iterative fashion until the solution has converged. A component can be a section of material in the solar unit, or a section of the carrier fluid.

Generally, heat transfer for the solar insolation is equal to the absorptivity of any given component times the incident solar insolation. Heat transfer communication with the component may be with another component, the carrier fluid, or ambient surfaces and/or sky. During operation of solar thermal units of the present technology, such as solar thermal unit 100, heat may transfer to the heat absorbing fluid in four stages: (1) forced internal convection from the glazing layer and any interstitial layer in the first portion of the fluid path 118, 160, 518, (2) forced internal convection from the interstitial layer and the top surface of the porous heat absorbing layer in the second portion on the fluid path 140, 164, 522, (3) porous flow convection from the porous heat absorbing layer in the third portion on the fluid path 142, 166, 524, and (4) forced internal convection from the bottom surface of the porous heat absorbing layer and the insulation in the fourth portion on the fluid path 144, 168, 526.

In the first, second, and fourth portions of the fluid path, heat transfer to the heat absorbing fluid under forced convection may be governed by the equation for forced convection between two flat plates:

$$Q_{Flat\ Plate} = \frac{Nu_{Flat\ Plate} * k}{th} A * (T_F - T_M) \quad \text{Equation 1}$$

where Q is the transferred power (W). Nu is the non-dimensional Nusselt number (M8 for parallel plates). The value of k is the thermal conductivity of the heat absorbing fluid (W/(mK)). A is the area of each plate (m$^2$) through which the flow travels, such as the first glazing layer 102 and the first interstitial layer 126, the second glazing layer 146 and the second interstitial layer 170, the glazing layer 502 and the interstitial layer 528, or the bottom surface of the porous heat absorbing layers and the bottom of the insulation layer. $T_F$ is the temperature of the heat absorbing fluid (C). $T_M$ is the temperature of the material. The denominator th is the thickness between the two plates.

In the third portion on the fluid path 142, 166, 524, heat transfer to the heat absorbing fluid may be governed by:

$$Q_{Porous} = \frac{Nu_{Porous} * k}{th} A_{Eff} * (T_F - T_M) \quad \text{Equation 2}$$

where $NU_{Porous}$ is on the order of M 100 for porous materials and $A_{Eff}$ is the effective surface area of the material (typically a factor of several hundred times the volume of the material), and th is the thickness of the absorber.

Heat transfer between individual solar thermal components can occur by either convection or radiation. Radiation may be governed by:

$$Q_{rad} = \frac{\sigma(T_1^4 - T_2^4)}{\frac{1}{\epsilon 1} + \frac{1}{\epsilon 2}} \quad \text{Equation 3}$$

where Qrad is the radiated power, $T_1$ and $T_2$ are the temperatures of the two communicating surfaces, $\sigma$ is the Stefan-Boltzmann constant, and $\epsilon 1$ and $\epsilon 2$ are the emissitivities of the two surfaces. The equation can include a View Factor multiplier to account for a porous material transmitting some radiation through the pores, and thus a component might "see through" that component to pick up additional radiation from another component.

Heat from the solar flux in each component may be governed by:

$$Q_{Flux} = a * F * A \quad \text{Equation 4:}$$

where $\alpha$ is the absorptivity of the material and F is the solar flux incident on that material (W/m2, taking into account that inner components see a flux equal to the total flux times the transmissivity of the components above).

In determining how the system functions, radiative and convective heat loss of a solar thermal unit of the present technology may also be taken into account. Radiative heat transfer to ambient may use the same equation as radiative transfer between components. Convective heat transfer may be governed by:

$$Q_{Amb.Conv.} = (5.7 + 3.8 * Wind_{Velocity}) * A * (T_{Surface} - T_{Ambient}) \quad \text{Equation 5:}$$

where $Q_{Amb.Conv.}$ is the convective heat loss, $Wind_{Velocity}$ is the velocity of the wind in the immediate vicinity of the solar thermal unit, $T_{surface}$ is the temperature of the relevant surface of the solar thermal unit, and $T_{ambient}$ is the ambient temperature in the immediate vicinity of the solar thermal unit.

The iterative solution begins by assuming that each component begins at a temperature equal to the ambient temperature. The temperature is then advanced in time as follows:

$$T_{new} = T_{old} + \frac{\Delta t}{mCp} \sum_{All} Q_{component} \qquad \text{Equation 6}$$

where T is the temperature of the component, t is the time, m is the mass of the component, $C_p$ is the specific heat of the components, and $Q_{component}$ is the heat transfer for each individual component. The time step is selected such that the change in T is small compared to the magnitude of T. $T_{old}$ is then replaced with $T_{new}$ and the temperature is advanced another step forward in time. This process is repeated until the change in temperature for each step falls below a specified "stop" criteria, at which point the system of equations is considered to have converged and the final set of temperatures is the solution.

Efficiency of the system may be defined as the thermal energy transferred to the carrier fluid divided by the total solar insolation on the system as follows:

$$Eff = \frac{\dot{m}Cp(T_{fluid\_out} - T_{fluid\_in})}{\text{Flux} * \text{Area}} \qquad \text{Equation 7}$$

where $\dot{m}$ is the mass flow rate of the carrier fluid. The remaining energy that is absorbed from the solar flux but not transmitted to the carrier fluid is communicated back to the environment by radiative and convective heat transfer from an external surface (typically the top pane of glass and the outside of the insulation) to ambient.

The above system of equations describes the heat transfer in nearly any solar thermal unit design. The examples described herein may produce higher efficiencies than traditional solar thermal units (such as a flat plate unit) for two reasons. One is that the convective heat transfer between the porous material and the carrier fluid may be significantly faster than that in a flat plate collection. The second is that the flow path in the porous design may be routed in such a way as to carry heat away from the top pane of glass (where most losses to ambient occur) and to ensure that the hotter components in the solar thermal are in more internal locations where the heat escapes back to ambient more slowly.

Fluid Flow and Pressure Drop

The efficiency and power usage of a solar thermal unit of the present technology may be affected by the flow of the heat absorbing fluid through each fluid path and the pressure drop across any fluid path within the unit.

Minimizing the pressure drop may reduce the amount of power required to pump the heat absorbing fluid through the system at a desired flow rate. Using a split-flow design, such as the example illustrated in FIGS. 1-4 may balance the pressure drop across the unit, and cut the pressure drop in half as compared to solar thermal units having only a single fluid path.

Uniformity of the air flow may be controlled by careful tolerance of the space between components of the thermal solar unit to control the pressure drop. There are three equations that may govern the flow along the fluid paths described herein. Design of the system may be governed by the following equations:

Couette Flow (steady flow between parallel plates), for setting the distance between the glazing:

$$\Delta P = \frac{12 \mu L Q}{h^3 w}$$

A modified Couette Flow (accounting for flow exiting or entering the porous heat absorbing layer) for the distances above and below the porous heat absorbing layer, porous heat absorbing layer to glazing or interstitial layer, and porous heat absorbing layer to bottom of insulation layer, respectively.

$$\Delta P = \frac{6\mu}{w} \frac{QL}{(2h_i^2 h_o)}$$

Darcy Flow through the porous heat absorbing layer, to determine the desired thickness of the porous heat absorbing layer.

$$\Delta P = \frac{Q \mu t}{k L w}$$

Netwons second law for fluid momentum may be used to determine the pressure drop required to turn flow 90 degrees at the inlet, outlet, and the transition (must be doubled because the flow turn 180 degrees) along a given fluid path.

$$\Delta P = \frac{1}{2} \rho v^2$$

In these equations, $\Delta P$ is the pressure drop (Pa), $\mu$ is the viscosity of the fluid (Pa*s), L is the length of the section (m), Q is the flow rate (m3/s), h is the gap thickness (m, initial and final if it varies), w is the width of the section (m), t is the thickness of the porous region (m), k is the diffusivity of the porous heat absorbing layer (m2/s), $\rho$ is the density of the fluid (kg/m^3), v is the velocity of the fluid (m/s) and A is the area through which the fluid is passing.

The area of the transition must be at least as large of an area as the cross sectional area between the glazing and the interstitial layer in order to prevent large pressure drops at the transition.

Example 1

A solar thermal unit of the present technology having the flow described above with respect to solar thermal unit 100 and an insulated plenum cover was made using the following materials and parameters.

The system comprised of a split-flow design where the each of the glazing and interstitial layers were made of iron free glass. The insulation was constructed of polyisocyanurate insulation (R-Value 6). The housing was 0.6 mm thick galvanized steel. Each of the porous heat absorbing layers was made with 1" thick mineral wool painted black to minimize reflective losses. The plenum cover was polyisocyanurate insulation. Total absorbing area was approximately two square meters. The spacing between the glazing and the interstitial layer for each flow path was set at $\frac{1}{8}^{th}$ inch. Each interstitial layer had dimensions of 36.5" long and 47.5" wide, while each glazing layer was 38.5" ling and 47.5" wide. The glazing layers were each supported by approximately 0.5" on each side, and the gap of each transition was about 1.0". The distance between each interstitial layer and each porous heat absorbing layer, and also between each porous heat absorbing layer and the bottom of the insulation, was about 1.25". The solar thermal unit was calibrated by providing forced air with a blower through a meter at known volumetric flow rates. The resulting pressure across the panes of glass was measured. This pressure was then matched with flow provided from a DC fan.

Figure 9:
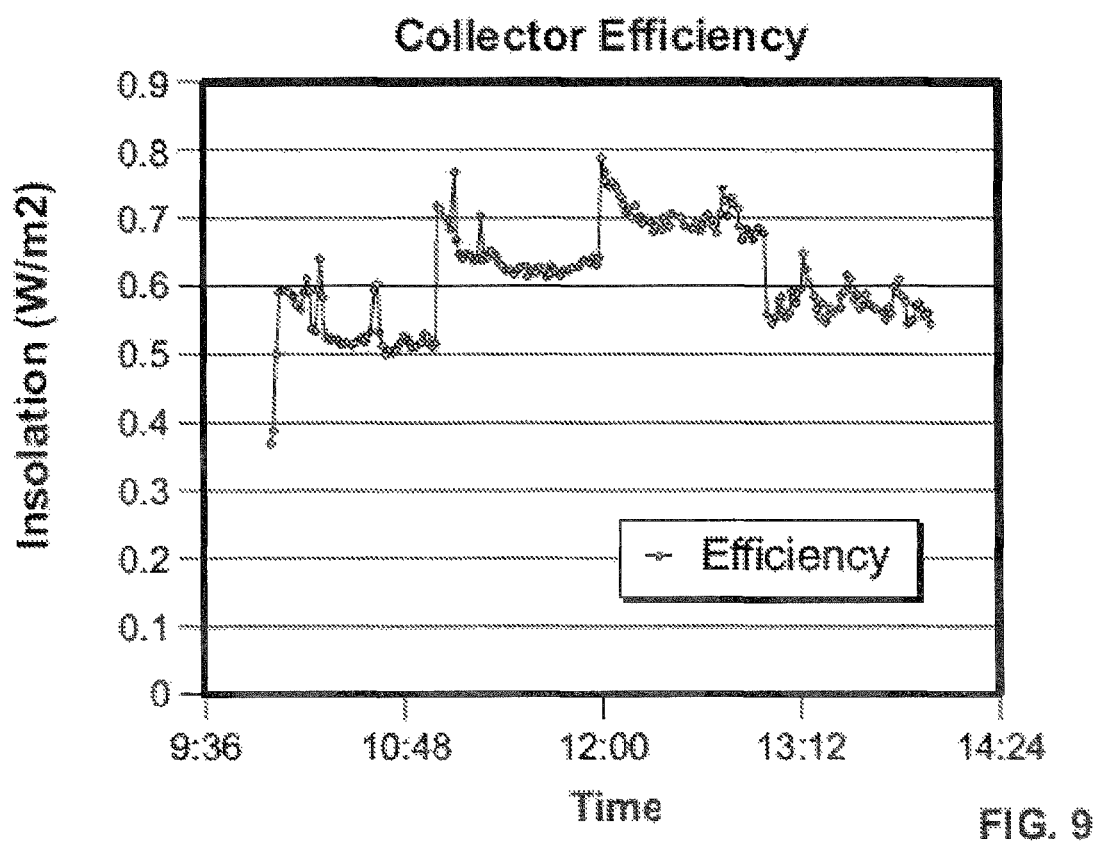
FIG. 9 is a graph of insolation versus time showing the results of testing one example of a solar thermal unit of the present technology.

The solar thermal unit was tested over a period of about 5 hours on a day that started out sunny and became cloudy for the last hour. The flow rate, measured in cubic feet per minute (CFM), was varied on an hourly basis. Specifically, the flow rate during the first hour was set to 40 CFM and the flow rate during the second hour was set to 50 CFM The ambient temperature, which was also the temperature at the inlet, was measured each hour. The results are illustrated in FIG. 9. The efficiency of the system was determined based on the insolation over time, and is set forth in Table 1 below.

TABLE 1

| Flow (CFM) | $T_{in} = T_{amb}$ (° C.) | Efficiency |
|---|---|---|
| 40 | 17.5 | 45% |
| 50 | 18.6 | 49% |

Example 2

A solar thermal unit of the present technology having a PV panel incorporated into the plenum cover was made using the following materials and parameters.

The system comprised of a split flow design where each of the glazing and interstitial layers was made of iron free glass. The insulation was constructed of polyisocyanurate insulation (R-Value 6). The housing was 0.6 mm thick galvanized steel. Each of the porous heat absorbing layers was made with 1" thick mineral wool painted black to minimize reflective losses. The plenum cover included a PV panel. Dimensions of the PV panel were 46.5" wide and 17.4" long. The spacing between each glazing layer and each interstitial layer was set at $\frac{1}{8}^{th}$ inch. Each interstitial layer had dimensions of 36.5" long and 47.5" wide, while each glazing layer was 38.5" ling and 47.5" wide. The glazing layers were each supported by approximately 0.5" on each side, and the gap of each transition was about 1.0". Total absorbing area (not including the area of the PV panel) was approximately two square meters. The distance between each interstitial layer and each porous heat absorbing layer, and also between each porous heat absorbing layer and the bottom of the insulation, was about 1.25". The solar thermal unit was calibrated by providing forced air with a blower through a meter at known volumetric flow rates. The resulting pressure across the panes of glass was measured. This pressure was then matched with flow provided from a DC fan.

The solar thermal unit was mounted on a scissor-jack system, which allowed the orientation of the solar thermal unit to be altered by rotation through a range of angles, from 0° to 45°. The ability to adjust the angle at which the solar thermal unit is advantageous, such as when using the solar thermal unit during different times of the year or in geographic areas of different latitude, allowing the solar thermal unit to be oriented as directly towards the sun as possible.

Example 3

Figure 14:
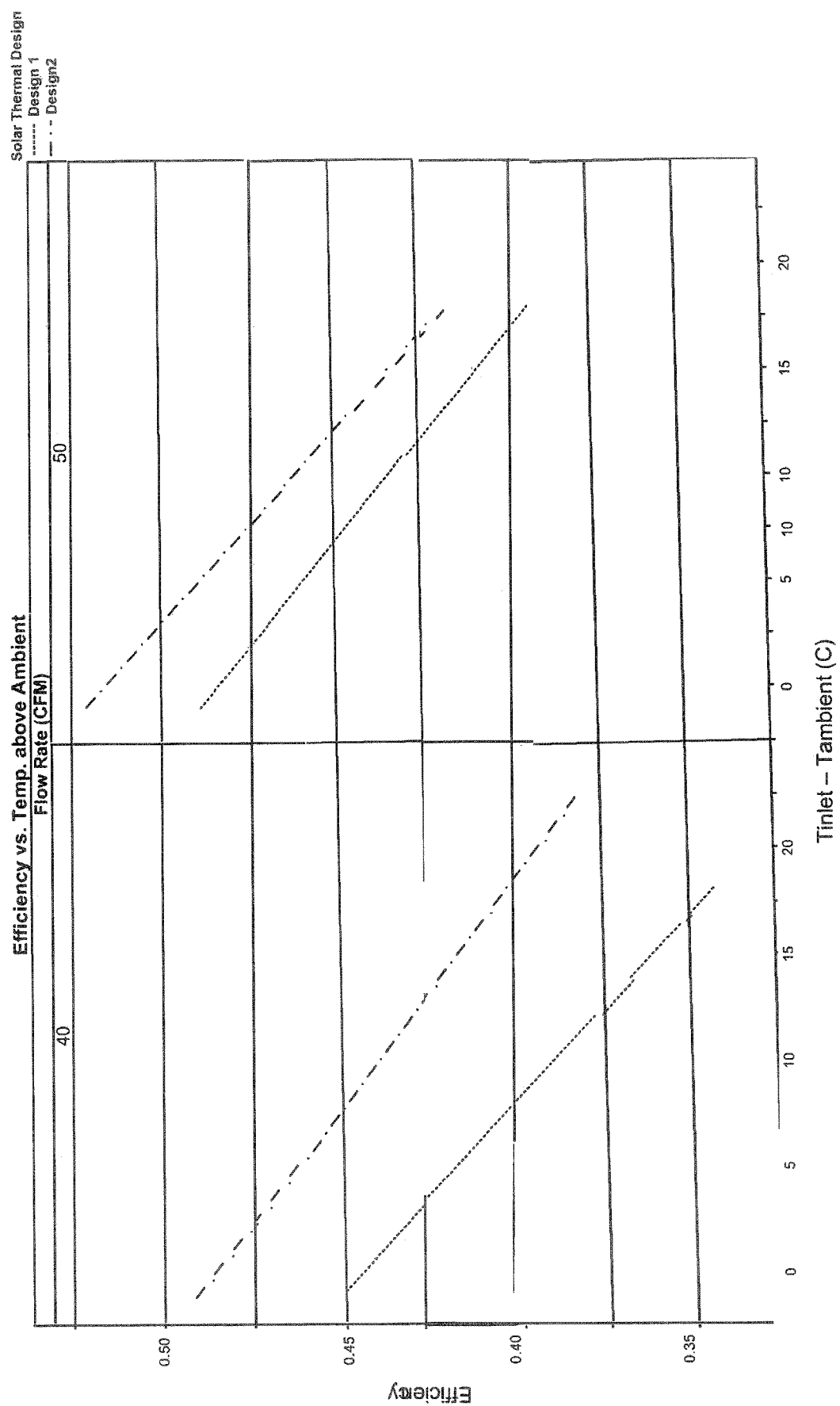
FIG. 14 is a graph of the efficiency versus temperature above ambient of the fifth example of the solar thermal unit, at two different flow rates.

FIG. 14 and Table 2 below provide the results of efficiency determinations for a solar thermal units of the present technology having the design of solar thermal unit 100 (Design 1) versus the reverse flow design of solar thermal unit 1000 (Design 2). In FIG. 14, the graph on the left shows the efficiency at a flow rate of 40 cfm. The graph on the right shows the efficiency at a flow rate of 50 cfm. The x-axis for each graph is the temperature at the inlet, expressed in the number of degrees above ambient.

Efficiency was calculated using this equation:

$$\text{Efficiency} = \frac{\text{Thermal Power} + \text{Electrical Power}}{\text{Insolation} * \text{Panel Area}}$$

where thermal power is calculated using the numerator of the equation from paragraph 89 and electrical power produced by the PV panel is calculated using the following equation:

Electrical Power=Volts*Amps

Additionally, the insolation was measured directly from a pyranometer placed on the panel during testing and the panel area is equal to 2.92 m².

As can be seen in FIG. 14 and Table 2, the efficiency for each of the designs at either flow rate is the highest when the temperature at the inlet equals the ambient temperature (0 on the x-axis). As can also be seen, the reverse flow design provided higher efficiency at both flow rates across the tested temperature range.

TABLE 2

Design Efficiency at Various Operating Conditions

| Design | Flow (CFM) | Tinlet-Tambient (deg. C.) | Efficiency |
|---|---|---|---|
| 1 | 40 | 0 | 45% |
| 1 | 40 | 15 | 36% |
| 1 | 50 | 0 | 49% |
| 1 | 50 | 15 | 41% |
| 2 | 40 | 0 | 49% |
| 2 | 40 | 15 | 42% |
| 2 | 50 | 0 | 52% |
| 2 | 50 | 15 | 43% |

Applications

Solar thermal units of the present technology may be used in a number of applications, including residential, commercial, and industrial applications. For example, solar thermal units of the present technology may be used for residential heating of air and/or water, and may be mounted on the roof of a residential building or on the ground near a residential building. As another example, solar thermal units of the present technology may be used in any commercial or industrial application where heating of air or any other heat absorbing fluid is desired. In at least one example, a solar thermal unit of the present technology may be used as the thermal unit in a system for generating liquid water from air, such as the system described in U.S. Provisional Patent Application Ser. No. 62/145,995, filed on Apr. 10, 2015, which is incorporated herein by reference in its entirety.

Figure 10:
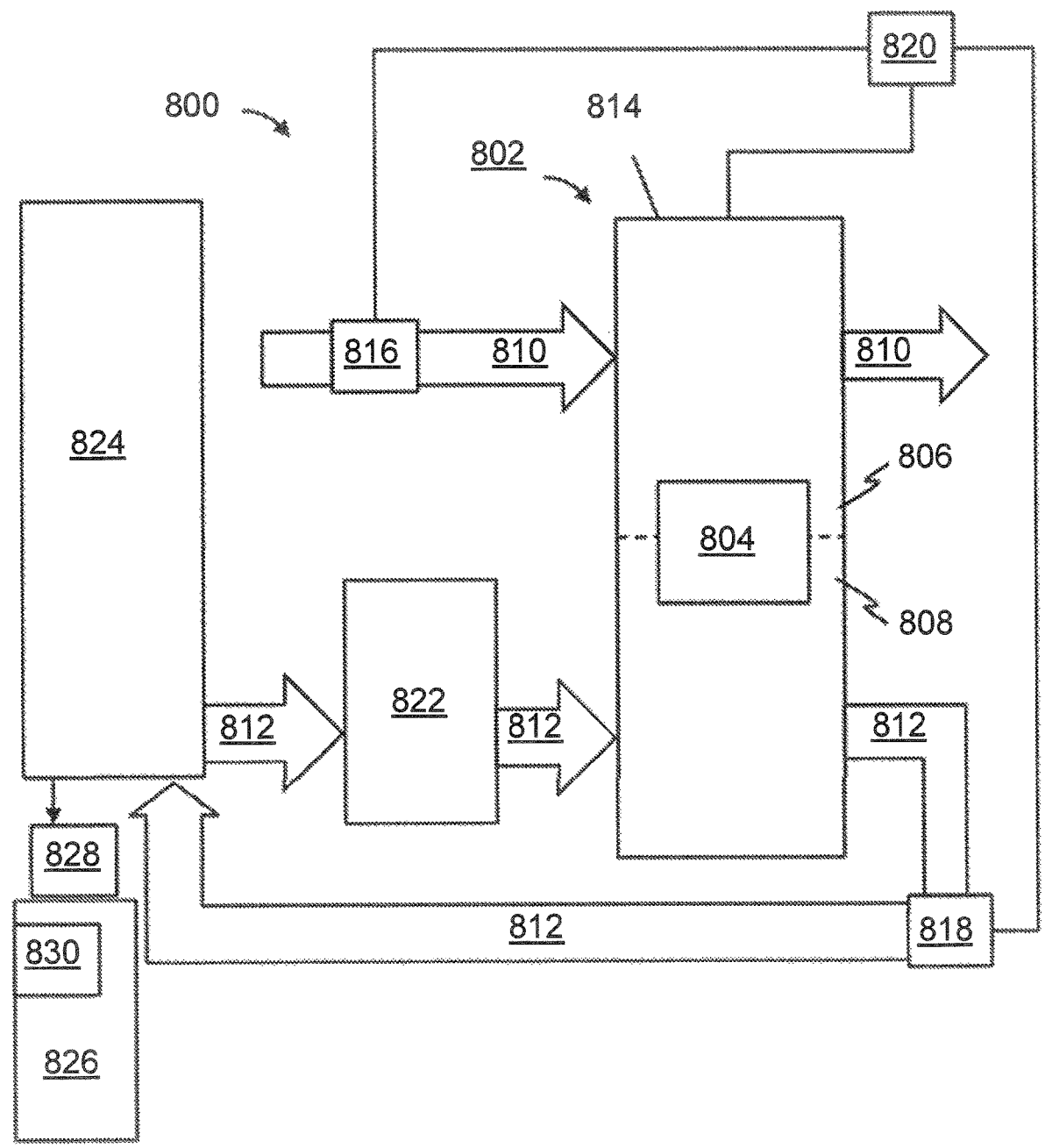
FIG. 10 is a diagram of a first system for generating liquid water from air in which a solar thermal unit of the present technology may be used.

One example where a solar thermal unit of the present technology may be used as the thermal unit in a system for generating liquid water from air is illustrated in FIG. 10. The system 800 of FIG. 10 may be configured to function responsive to diurnal variations. For example, as described in more detail below, system 800 may be configured to control one or more operational parameters (e.g., control and/or controlled variables) based on one or more diurnal variations (e.g., variations in ambient air temperature, ambient air relative humidity, solar insolation, and/or the like).

System 800 may comprise a desiccant unit 802. Desiccant unit 802 may comprise a desiccant (e.g., sorption medium) 804, where the desiccant unit 802 (e.g., or a portion thereof) may be selectively (e.g., and/or alternatively) movable between an adsorption zone 806, in which the desiccant is in fluid communication with a process air pathway (e.g., a process airflow path) 810 and a desorption zone 808, in which the desiccant is in fluid communication with a (e.g., closed-loop) regeneration fluid pathway (e.g., a regeneration fluid path) 812. In some embodiments, the adsorption and desorption zones may be defined by a housing (e.g., 814) of the desiccant unit 802.

Desiccant unit 802 may operate in a continuous, or non-batch, fashion, such that desiccant unit 802 is configured to absorb water and desorb water substantially simultaneously or simultaneously. For example, system 800 may be configured such that a first portion of desiccant unit 804 can be disposed within adsorption zone 806 (e.g., such that the first portion can capture water from process air in process air pathway 810), with a second portion of the desiccant simultaneously disposed within the desorption zone (e.g., such that the second portion can desorb water into regeneration fluid in regeneration fluid pathway 812). Regeneration fluids suitable for use in some embodiments of the present systems may include, but are not limited to, air (e.g., including any suitable amount of water vapor), super-saturated or high relative humidity gas (e.g., 90-100% relative humidity), glycols, ionic liquids, and/or the like.

Desiccant unit 802 may comprise a hygroscopic material (e.g., desiccant or sorption medium 804) configured to continuously alternate between a process air pathway 810 and a regeneration fluid pathway 812. In some embodiments, that the desiccant or sorption medium may be capable of quickly desorbing water back into low relative humidity air (e.g., to regenerate the desiccant). Therefore, in some embodiments, the performance of the desiccant or sorption medium may be driven by an ability to quickly cycle through an absorption state and a desorption state.

Desiccant 804 may comprise any suitable medium in any suitable configuration (e.g., such that the desiccant or sorption medium is capable of adsorption and desorption of water). In some embodiments, the desiccant or sorption medium may be capable of sorption at a first temperature and/or pressure and desorption at a second temperature and/or pressure. Suitable desiccants or sorption mediums may comprise liquids, solids, and/or combinations thereof. In some embodiments, desiccants or sorption mediums may comprise any suitable porous solid impregnated with hygroscopic materials. For example, desiccant unit 804 may comprise silica, silica gel, alumina, alumina gel, montmorillonite clay, zeolites, molecular sieves, activated carbon, metal oxides, lithium salts, calcium salts, potassium salts, sodium salts, magnesium salts, phosphoric salts, organic salts, metal salts, glycerin, glycols, hydrophilic polymers, polyols, polypropylene fibers, cellulosic fibers, derivatives thereof, and combinations of thereof. In some embodiments, the desiccant or sorption medium may be selected and/or configured to avoid sorption of certain molecules (e.g., molecules that may be poisonous when consumed by a human).

In some embodiments, desiccant particles may be packed in a shallow bed to maximize a surface area for interaction with air or fluid within adsorption zone 806 and desorption zone 808. In some embodiments, the desiccant particles may be agglomerated via a binder. In some embodiments, the desiccant particles may be dyed black (e.g., to improve absorption of thermal radiation). In some embodiments, the desiccant particles may be mixed and/or combined with thermal radiation absorbing materials.

System 800 may include one or more blowers 816 and/or one or more circulators 818. For example, in this embodiment, blower 816 is disposed in process air pathway 810 and is configured to adjust a flow rate of air through the process air pathway. Circulator 818, in this embodiment, is disposed in regeneration fluid pathway 812 and is configured to adjust a flow rate of fluid through the regeneration fluid pathway. In some embodiments, blower 816 and/or circulator 818 may be controlled by controller 820 (e.g., controlling a speed of blower 816 and/or circulator 818 to optimize liquid water production). In some embodiments, blower 816 and/or circulator 818 may be configured to substantially maintain a predetermined flow rate through process air pathway 810 and/or regeneration fluid pathway 812, respectively.

System 800 may comprise a thermal unit 822, configured to provide thermal energy to fluid in regeneration fluid pathway 812 (e.g., such that desiccant unit 804 may be regenerated). Thermal unit 822 may be a solar thermal unit of the present technology, where the heat absorbing fluid 116, 516 (as shown in FIGS. 3 and 5) from the outlet 122, 522 (as shown in FIGS. 1 and 5) travels along the regeneration fluid pathway 812 from the thermal unit 822 to the desiccant unit 804.

System 800 may comprise a condenser 824 configured to receive fluid from the desorption zone via the regeneration fluid pathway and produce liquid water from the received fluid (e.g., by condensing water vapor in fluid in the regeneration fluid pathway). Condensers 824 may comprise any suitable material and may be of any suitable configuration (e.g., to condense water vapor in regeneration fluid into liquid water). For example, suitable condensers may comprise polymers, metals, and/or the like. Condensers may be arranged to include coils, fins, plates, tortuous passages, and/or the like. Condenser 80 may be configured to transfer thermal energy from fluid in regeneration fluid pathway 812 downstream of desiccant unit 804 to air in process air pathway 810 upstream of desiccant unit 804 (e.g., such that air in process air pathway 810 may facilitate cooling of condenser 824). In some embodiments, condenser 824 may be cooled by ambient air.

System 800 may comprise a water collection unit 826 configured to receive liquid water produced by condenser 824. Liquid water produced by the condenser may be provided to water collection unit 826 by way of gravity; however, in other embodiments, flow of liquid water from the condenser to the water collection unit may be assisted (e.g., by one or more pumps, any other suitable delivery mechanism, and/or the like).

System 800 may comprise a filter 828 (e.g., a filtration membrane), which may be positioned between condenser 824 and water collection unit 826 (e.g., to reduce an amount of impurities, such as, for example, sand, bacteria, fibrous, carbonaceous species, and/or the like, which may be present in liquid water produced by condenser 824).

Water collection unit 826 (e.g., or filter 828 thereof) may comprise an ultraviolet (UV) light source (e.g., for disinfection of water produced by condenser 826). In some embodiments, suitable light sources may comprise light emitting diodes (LEDs) having, for example: wavelengths below 400 nanometers (nm) (e.g., 385 nm, 365 nm, and/or the like), wavelengths below 300 nm (e.g., 265 nm), and/or the like.

Figure 11:
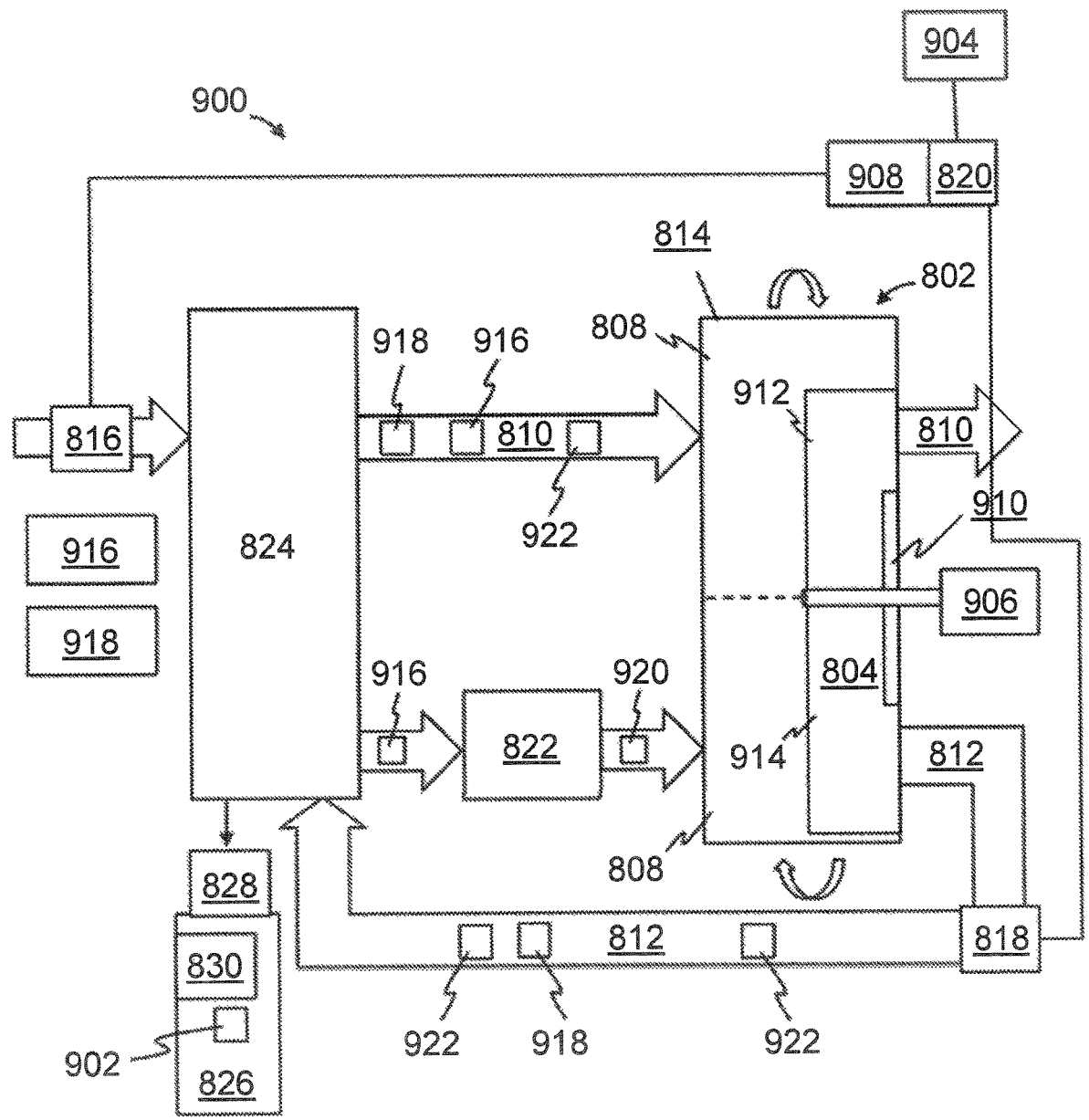
FIG. 11 is a diagram of a second system for generating liquid water from air in which a solar thermal unit of the present technology may be used.

Water collection unit 826 may comprise one or more water level sensors (e.g., 902 of FIG. 11). Such water level sensors may comprise conductance sensors (e.g., open and/or closed circuit resistance-type conductance sensors), which may operate via conductivity measurement of water in the range of 0.1 msiemens per cm.

Water collection unit 826 may comprise a receptacle 830 configured to receive one or more additives for introduction to the produced liquid water. Such additives may be configured to dissolve slowly into liquid water stored in the water collection unit. Additives may include, but are not limited to, minerals, salts, other compounds, and/or the like. In some embodiments, additives may impart flavor to the produced liquid water. For example, additives may include potassium salts, magnesium salts, calcium salts, fluoride salts, carbonate salts, iron salts, chloride salts, silica, limestone, and/or combinations thereof System 800 may comprise indicators (e.g., lights, such as, for example, LEDs), which may be configured to provide information regarding system operation. For example, in some embodiments, indicator lights may be configured to provide information (e.g., visually, for example, to a user) that the system is running, that solar power (e.g., from power unit 904) is available, that an air filter (e.g., within process air pathway 810) may need to be changed, that a water collection unit (e.g., 826) is full (e.g., in some embodiments, that the water collection unit contains 20 L of liquid water), that an actuator (e.g., actuator 906, blower 816, circulator 818, and/or the like) has failed and/or is failing, that telematics errors (e.g., as indicated by transceiver 908 operation) have and/or are occurring, and/or the like. As described below, any suitable information (including the information described above with reference to indicators) may be transmitted over a communications network (e.g., alone and/or in addition to operation of any indicators).

A controller (e.g., processor) 820 may control exposure of desiccant unit 804 (or a portion thereof) to air in process air pathway 810 and regeneration fluid in regeneration fluid pathway 812 (e.g., to increase and/or optimize the liquid water ultimately produced by condenser 824), and such control may vary over a diurnal cycle (e.g., in response to diurnal variations). Such variations in environmental conditions (e.g., inputs into controller 820) may include, for example, ambient air temperature, ambient air relative humidity, and solar insolation. Other inputs to controller 820 may include, for example, an amount of thermal energy generated by thermal unit 822, a relative humidity of air in process air pathway 810, a relative humidity of fluid in regeneration fluid pathway 812, a temperature of fluid in the regeneration fluid pathway between desiccant unit 804 and thermal unit 822, a rate of water production, and/or the like. In embodiments that include a purge airflow path, inputs to controller 820 may include a flow rate, temperature, relative humidity and/or the like of air in the purge airflow path. Controller 820 may be configured to optimize liquid water production by controlling a rate of desiccant unit 804 movement between the adsorption zone and the desorption zone, controlling a speed of blower 816 and/or circulator 818, and/or the like, based, on measurements of one or more of such inputs (e.g., such that controller 820 may optimize liquid water production based on current environmental and system conditions). As described in more detail below, inputs to controller 820 may be measured in that they are indicated in data captured by one or more sensors.

FIG. 11 is a diagram of an embodiment 900 of a system for generating liquid water from air. System 900 may be substantially similar to system 800, with the primary differences and/or additions described below. Otherwise, system 900 may comprise any and/or all features described with respect to system 800.

In system 900, as with system 800, desiccant 804 (or a first portion thereof) may be in fluid communication with process air in process air pathway 810 while the desiccant 804 (or a second portion thereof) is simultaneously in fluid communication with regeneration fluid in regeneration fluid pathway 812, and, thus, desiccant unit 802 operates in a continuous and non-batch manner. In this embodiment, sections of desiccant 804 may be exposed to air in process air pathway 810 and fluid in regeneration fluid pathway 812 in an alternating manner.

System 900 may comprise a rotatable disk 910 (e.g., with desiccant 804 disposed thereon). Desiccant 804 (or sections thereof) may be configured to move between the adsorption zone and the desorption zone as disk 910 is rotated. For example, in the depicted orientation of disk 910, a portion 912 of the desiccant is in communication with process air pathway 810, and a portion 914 of the disk is in communication with regeneration fluid pathway 812. System 900 may comprise an actuator (e.g., electrical motor) 906 configured to cause rotation of disk 910. Controller 820 may be configured to optimize liquid water production at least by controlling movement (e.g., through control of actuator 906) of desiccant 804 (e.g., disk 910) between the adsorption zone and the desorption zone. In other embodiments, actuator 906 may rotate disk 910 at a predetermined rotation rate.

Figure 2:
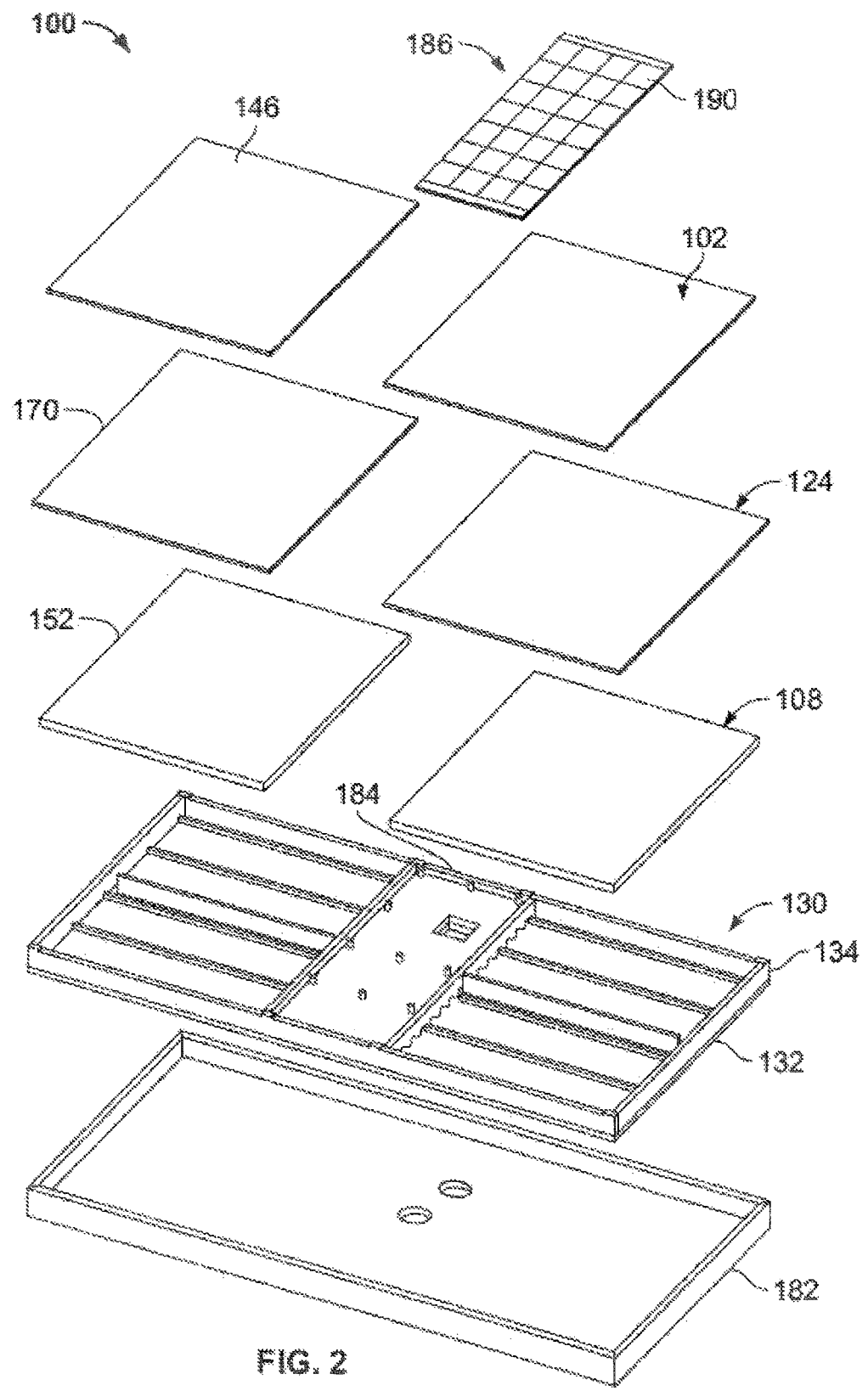
FIG. 2 is an exploded view of the solar thermal unit of FIG. 1.

System 900 may comprise a solar power unit 904 configured to provide power to at least a portion of system 900 (e.g., blower 42, circulator 46, actuator 114, and/or the like). Solar power unit 904 may be configured to convert solar insolation to electrical power (e.g., solar power unit 904 comprises a solar panel). For example, solar power unit 904 may be provided as a photovoltaic (PV) solar panel comprising semiconducting materials exhibiting a photovoltaic effect. In these and similar embodiments, controller 820 may be configured to control system 900 in response to diurnal variations in solar insolation (e.g., an amount of electrical power generated by solar power unit 904). In some examples, the solar power unit 904 may be PV panel 190 (as shown in FIGS. 1-2).

Systems for generating liquid water from air may be modular in nature. For example, systems may be configured such that each component (e.g. solar power unit 904, thermal unit 822, desiccant unit 802, condenser 824, water collection unit 826, and/or the like) may be separated from one another, transported, assembled and/or re-assembled with one another (e.g., in a same or a different configuration), and/or the like. For example, in some embodiments, the system may be configured such that no dimension of any singular component (e.g., water collection unit 826, desiccant unit 802, solar power unit 904, thermal unit 822, condenser 824, and/or the like) is larger than six to eight feet (e.g., to facilitate transport of the system or components thereof, for example, in a single cab truck bed, such as a bed of a Toyota Hilux pickup truck) (e.g., each component has a footprint that is less than or equal to 64 square feet (ft$^2$) and/or each component can be contained within a cubic volume less than or equal to 512 cubic feet (ft$^3$)).

Controller 820 may be configured to control one or more of blower 826, circulator 828, actuator 906, and/or the like (e.g., to optimize liquid water production, where such control may be in response to diurnal variations, for example, in ambient temperature, ambient air relative humidity, solar insolation, and/or the like). For example, controller 820 may be configured to increase a rate of liquid water production by controlling blower 826, circulator 828, actuator 906, and/or the like, taking into account, for example, diurnal variations. Such variations may change the amount of thermal energy generated by thermal unit 822, the level of electrical power provided by solar power unit 904, the level of humidity in process air entering the system, and/or the like. In some embodiments, ambient conditions may be measured in real-time or can be forecast based on, for example, historical averages and/or the like. In embodiments in which controller 820 receives real-time measurements, various sensors (described in more detail below) may provide data indicative of ambient conditions to controller 820 (e.g., continuously, periodically, when requested by controller 820, and/or the like).

Controller 820 may operate the system based on one or more of: a user selection, data received from one or more sensors, programmatic control, and/or by any other suitable bases. For example, controller 820 may be associated with peripheral devices (including sensors) for sensing data information, data collection components for storing data information, and/or communication components for communicating data information relating to the operation of the system.

System 900 may comprise one or more peripheral devices, such as sensors 902 and 916-922 (e.g., temperature sensors 916, humidity sensors 918, solar insolation sensor 920, flow rate sensors 922, water level sensor 902, and/or the like). In some embodiments, one or more sensors may provide data indicative of ambient air temperature, ambient air relative humidity, solar insolation, process air temperature, regeneration fluid temperature, process air relative humidity, regeneration fluid relative humidity, process air flow rate, regeneration fluid flow rate, liquid water production rate, water usage rate, and/or the like.

One or more sensors 902 and 916-922 may be located remotely from other components of the system and may provide captured data to the other components of the system via a wired and/or wireless connection. For example, a town, village, city, and/or the like may include a plurality of the present systems, and one of the plurality of the present systems may provide data indicative of ambient environmental conditions (e.g., air temperature, air relative humidity, a solar insolation level, and/or the like) to another one of the plurality of the present systems. In this way, in some embodiments, a single sensor may be shared by multiple systems. In some embodiments, data communicated to a controller (e.g., 820) by one or more peripheral devices (e.g., one or more sensors 902 or 916-922) may be stored in a data logging unit.

System 900 may comprise a telematics unit (e.g., a transmitter, receiver, transponder, transverter, repeater, transceiver, and/or the like, sometimes referred to herein as "transceiver 908"). For example, a transceiver 908 may be configured to communicate data to and/or from the system (e.g., controller 820) via a wired and/or wireless interface (e.g., which may conform to standardized communications protocols, such as, for example, GSM, SMS components operating at relatively low rates (e.g., operating every few minutes), protocols that may be geographically specified, and/or the like).

Transceiver 908 may be associated with a server and a communications network for communicating information between the server and the transceiver (e.g., and thus the system and/or a controller 820 thereof). Two-way communication may be facilitated by a cellular tower in cellular range of the system. In some embodiments, a database (e.g., which may be remote from the system) may be configured to store information received from the server over the communications network.

In embodiments with telematics capability, a network administrator or device owner may send a command to controller 820 to update or delete look-up table data (described below) and/or a control algorithm. In this way, data security may be maintained, for example, in the case that the system is stolen or otherwise lost.

Controller 820 may be configured to vary operation of system 900 at least based on real-time and/or forecast variations in ambient conditions. For example, controller 820 may control exposure of desiccant 804 (e.g., or sections thereof) to process air and regeneration fluid in response to changes in ambient conditions (e.g., by changing the rotational speed of disk 910, such that the time that a portion of desiccant 804 disposed thereon is exposed to process air in process air pathway 810 or regeneration fluid in regeneration fluid pathway 812 may be increased or decreased). In some embodiments, controller 820 may be configured to vary a size of an adsorption zone or a desorption zone (e.g., in response to diurnal variations).

From the foregoing, it will be appreciated that although specific examples have been described herein for purposes of illustration, various modifications may be made without deviating from the scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A solar thermal unit comprising:
    a glazing layer;
    a first porous light absorbing material layer disposed below and spaced apart from the glazing layer, and configured so that, during operation of the solar thermal unit, a temperature of a top surface of the first porous light absorbing material layer is lower than a temperature of a bottom surface of the first porous light absorbing material layer;
    a first interstitial layer disposed between the glazing layer and the first porous light absorbing material layer, the first interstitial layer comprising a photovoltaic panel and an end forming a gap; and,
    a first fluid flow path configured to direct a regeneration fluid in a first portion of the first fluid flow path between an inner surface of the glazing layer and a top surface of the first interstitial layer through a first transition around the end of the first interstitial layer through the gap to redirect the regeneration fluid in a second portion of the first fluid flow path between a bottom surface of the interstitial layer and the top surface of the porous light absorbing material layer, and then through a thickness of the first porous light absorbing material layer;
    wherein the regeneration fluid collects heat from the glazing layer and the top and bottom surfaces of the photovoltaic panel in advance of flowing through the thickness of the first porous light absorbing material layer.

2. The solar thermal unit of claim 1, wherein at least one surface of the photovoltaic panel is modified to promote flow interaction with the photovoltaic panel.

3. The solar thermal unit of claim 1, wherein the solar thermal unit further comprises:
a second porous light absorbing material layer disposed below and spaced apart from the glazing layer;
a second interstitial layer disposed between the glazing layer and the second porous light absorbing material layer;
a second fluid flow path configured to direct a portion of the regeneration fluid along an inner surface of the glazing layer and a top surface of the second interstitial layer in advance of flow through the second porous light absorbing material layer; and,
wherein the solar thermal unit is configured to distribute the regeneration fluid between the first fluid flow path and the second fluid flow path;
wherein the regeneration fluid in the second fluid flow path is configured to collect heat first from the glazing layer, and then from the second porous light absorbing material layer.

4. The solar thermal unit of claim 3, wherein at least one of the first interstitial layer and the second interstitial layer comprises at least one of a photovoltaic panel and a glazing.

5. The solar thermal unit of claim 3, wherein the first fluid flow path is configured to direct the regeneration fluid:
between the glazing layer and the first interstitial layer, through the first transition disposed between the first interstitial layer and the second interstitial layer,
between the first interstitial layer and the first porous light absorbing material layer, and through the first porous light absorbing material layer.

6. The solar thermal unit of claim 5 wherein, within the first transition, the regeneration fluid of the first fluid flow path intermingles with the regeneration fluid of the second fluid flow path.

7. A solar thermal unit of a water generation system comprising:
a glazing layer;
a first porous light absorbing material layer disposed below and spaced apart from the glazing layer, and configured so that, during operation of the solar thermal unit, a temperature of a top surface of the first porous light absorbing material layer is lower than a temperature of a bottom surface of the first porous light absorbing material layer;
a first interstitial layer comprising a photovoltaic panel configured to provide power to the water generation system, the first interstitial layer including an end forming a gap;
a regeneration fluid flow path configured to direct a regeneration fluid in a first portion of the first fluid flow path along an inner surface of the glazing layer and a top surface of the photovoltaic panel, through a first transition around the end of the first interstitial layer through the gap to redirect the regeneration fluid in a second portion of the first fluid flow path between a bottom surface of the photovoltaic panel and the top surface of the porous light absorbing material layer, before flowing through a thickness of the first porous light absorbing material layer;
wherein the regeneration fluid collects heat from the glazing layer and the top and bottom surfaces of the photovoltaic panel in advance of flowing through the thickness of the first porous light absorbing material layer.

8. A water generation system comprising:
a solar thermal unit comprising:
a glazing layer;
a first porous light absorbing material layer disposed below and spaced apart from the glazing layer, and configured so that, during operation of the solar thermal unit, a temperature of a top surface of the first porous light absorbing material layer is lower than a temperature of a bottom surface of the first porous light absorbing material layer;
a first interstitial layer disposed between the glazing layer and the first porous light absorbing material layer; the first interstitial layer comprising a photovoltaic panel and an end forming a gap;
a regeneration flow path configured to direct a regeneration fluid in a first portion of the first fluid flow path between an inner surface of the glazing layer and a top surface of the first interstitial layer, through a first transition around the end of the first interstitial layer through the gap to redirect the regeneration fluid in a second portion of the first fluid flow path between a bottom surface of the first interstitial layer and the top surface of the porous light absorbing material layer, in advance of flowing through a thickness of the first porous light absorbing material layer;
a desiccant in fluid communication with the regeneration flow path;
a circulator configured to adjust a flow rate of the regeneration fluid in the regeneration flow path; and,
a condenser configured to receive the regeneration fluid from the solar thermal unit via the regeneration flow path and condense water vapor in the received regeneration fluid to produce liquid water;
wherein the regeneration fluid collects heat from the glazing layer and the top and bottom surfaces of the first interstitial layer in advance of flowing through the thickness of the porous light absorbing material layer before being received by the condenser.

9. The water generation system of claim 8, wherein the photovoltaic panel is configured to power the water generation system including the circulator.

10. The water generation system of claim 9, further comprising a controller configured to control the speed of the circulator based on an amount of electrical power generated by the photovoltaic panel.

11. The water generation system of claim 8, further comprising a controller configured to control the water generation system in response to diurnal variations in solar insolation.

12. The water generation system of claim 8, wherein the desiccant is combined with thermal radiation absorbing materials.

13. The water generation system of claim 8, wherein the solar thermal unit is configured to distribute the regeneration fluid between a plurality of sub-flow paths of the regeneration flow path to balance the pressure drop across the solar thermal unit.

14. The system of claim 8, further comprising a controller configured to control the exposure of the desiccant to a process air path and the regeneration fluid in regeneration flow path.

15. The system of claim 8, further comprising a controller configured to control the water generation system in response to variations in input conditions.

16. The system of claim 15, wherein the variations in input conditions comprise: an ambient air temperature, an ambient air relative humidity, a solar insolation, an amount of thermal energy generated, an amount of electrical power generated, a relative humidity of air in a process air path, a relative humidity of fluid in the regeneration fluid path, a temperature of fluid in the regeneration fluid path, a water production rate, a water usage rate, or a combination thereof.

17. The system of claim 8, wherein the system comprises one or more sensors to provide, to a controller, data indicative of: an ambient air temperature, an ambient air relative humidity, a solar insolation, an amount of thermal energy generated, an amount of electrical power generated, a process air temperature, a regeneration fluid temperature, process air relative humidity, a regeneration fluid relative humidity, a process air flow rate, a regeneration fluid flow rate, a water production rate, a water usage rate, or a combination thereof.

18. A system comprising:
- a glazing layer;
- a first porous light absorbing material layer disposed below and spaced apart from the glazing layer;
- a first interstitial layer disposed between the glazing layer and the first porous light absorbing material layer; and,
- a second porous light absorbing material layer disposed below and spaced apart from the glazing layer; and,
- a second interstitial layer disposed between the glazing layer and the second porous light absorbing material layer;

wherein the solar thermal unit is configured to distribute the regeneration fluid between a first fluid flow path and a second fluid flow path;

wherein the first fluid flow path directs the regeneration fluid between an inner surface of the glazing layer and a top surface of the first interstitial layer, through a first transition disposed between the first interstitial layer and the second interstitial layer, in advance of flow through the first porous light absorbing material layer to collect heat from the glazing layer, and then from the first porous light absorbing material layer; and, wherein the second fluid flow path directs the regeneration fluid between an inner surface of the glazing layer and a top surface of the second interstitial layer, through the first transition disposed between the first interstitial layer and the second interstitial layer, in advance of flow through the second porous light absorbing material layer to collect heat from the glazing layer, and then from the second porous light absorbing material layer.

19. The system of claim 18, wherein within the first transition, the regeneration fluid of the first fluid flow path intermingles with the regeneration fluid of the second fluid flow path.

20. The system of claim 18, wherein the first interstitial layer, the second interstitial layer, or both the first and second interstitial layers comprise a photovoltaic panel.

* * * * *